(12) United States Patent
Chen et al.

(10) Patent No.: US 11,012,154 B2
(45) Date of Patent: May 18, 2021

(54) SYSTEMS AND METHODS FOR MEASURING A MODAL DELAY AND A MODAL BANDWIDTH

(71) Applicant: CORNING INCORPORATED, Corning, NY (US)

(72) Inventors: Xin Chen, Painted Post, NY (US); Kangmei Li, Painted Post, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/905,117

(22) Filed: Jun. 18, 2020

(65) Prior Publication Data

US 2021/0006331 A1  Jan. 7, 2021

Related U.S. Application Data

(60) Provisional application No. 62/869,276, filed on Jul. 1, 2019.

(51) Int. Cl.
*H04B 10/079* (2013.01)
*G01M 11/00* (2006.01)
(Continued)

(52) U.S. Cl.
CPC ....... *H04B 10/0795* (2013.01); *G01M 11/333* (2013.01); *H04B 10/25* (2013.01); *H04B 10/54* (2013.01)

(58) Field of Classification Search
None
See application file for complete search history.

(56) References Cited

U.S. PATENT DOCUMENTS

| 68,858,022 | | 4/2005 | Oliveti et al. |
|---|---|---|---|
| 7,945,159 | B2 * | 5/2011 | Pape ................ H04B 10/0775 398/28 |

(Continued)

OTHER PUBLICATIONS

Hsuan-Yun Kao et al, "Comparison of single-/few-/multi-mode 850 nm VCSELs for optical OFDM transmission", vol. 25, No. 141 | Jul. 10, 2017 | Optics Express 16347.

*Primary Examiner* — David W Lambert
(74) *Attorney, Agent, or Firm* — Kevin L. Bray

(57) ABSTRACT

The present disclosure is directed to systems and methods for calculating a modal time delay and a modal bandwidth. For example, a method may include: transmitting an intensity-modulated light through a mode conditioner to generate a mode-conditioned intensity-modulated light; transmitting the mode-conditioned intensity-modulated light through an optical fiber under test (FUT) to excite a plurality of modes of the optical FUT; converting the mode-conditioned intensity-modulated light transmitted through the optical FUT into an electrical signal; measuring, based on the electrical signal, a transfer function or a complex transfer function of the optical FUT based on at least on one pair of the plurality of modes; calculating a modal delay time of the optical FUT based on the transfer function or the complex transfer function; and calculating a modal bandwidth of the optical FUT based on the modal delay time, the modal bandwidth being calculated for any given launch conditions of the plurality of modes.

24 Claims, 20 Drawing Sheets

(51) Int. Cl.
  *H04B 10/25* (2013.01)
  *H04B 10/54* (2013.01)

(56) References Cited

U.S. PATENT DOCUMENTS

| | | | |
|---|---|---|---|
| 8,588,569 | B2 | 11/2013 | Bookbinder et al. |
| 8,666,214 | B2 | 3/2014 | Bookbinder et al. |
| 8,797,519 | B2* | 8/2014 | Chen .................... H04B 10/071 |
| | | | 356/73.1 |
| 8,891,925 | B2 | 11/2014 | Bickham et al. |
| 9,377,377 | B2 | 6/2016 | Chen et al. |
| 2011/0054861 | A1* | 3/2011 | Lane .................... G01M 11/332 |
| | | | 703/2 |
| 2014/0226151 | A1* | 8/2014 | Bennett .............. G01M 11/3163 |
| | | | 356/73.1 |
| 2014/0318188 | A1* | 10/2014 | Bowker .............. G02B 6/0288 |
| | | | 65/378 |
| 2014/0319354 | A1* | 10/2014 | Chen .................. H04B 10/2581 |
| | | | 250/341.1 |
| 2016/0041332 | A1* | 2/2016 | Pimpinella .............. G06F 30/00 |
| | | | 385/124 |
| 2016/0254861 | A1* | 9/2016 | Molin .................. G01M 11/332 |
| | | | 398/29 |
| 2020/0257040 | A1 | 8/2020 | Chen et al. |

\* cited by examiner a1 = 0.5
a2 = 0.3
a3 = 0.3 a1 = 0.4
a2 = 0.2
a3 = 0.2 a1 = 1
a2 = 1
a3 = 1

SYSTEMS AND METHODS FOR MEASURING A MODAL DELAY AND A MODAL BANDWIDTH

This Application claims priority under 35 USC § 119(e) from U.S. Provisional Patent Application Ser. No. 62/869,276, filed on Jul. 1, 2019, and which is incorporated by reference herein in its entirety.

FIELD

The present disclosure relates to optical fibers and in particular relates to measuring a modal delay time(s) and modal bandwidth.

BACKGROUND

Standard single mode (SM) fiber is the preferred optical fiber for use in hyperscale data centers because it has more bandwidth than multimode (MM) fibers, thereby providing higher data rates and longer distance data transmission. On the other hand, hyperscale data centers also utilize relatively short data links, e.g., from 1 meter to 100 meters. In this distance range, MM fiber systems with MM vertical-cavity surface-emitting laser (VCSEL) transceivers offer lower cost solutions with lower power consumption. In practice, hyperscale data centers use standard SM fiber for both long and short data links to simplify the fiber cable management. In other words, in some cases, the cost savings and operational benefits associated with using MM fiber for the short data links does not outweigh the additional costs and complexity associated with the fiber cable management issues of dealing with two different types of fiber cables.

The fiber cable management issues can be avoided if low-cost optical transmission can be performed over the SM fiber for the short distance links. VCSELs that emit SM or few mode (FM) light offer the promise of better system performance than MM VCSELs. The SM or FM VCSELs are made using a platform and process similar to that used to form MM VCSELs so that their respective costs are about the same. On the other hand, the lower numerical aperture (NA) and smaller spot size of the light emission from SM and FM VCSELs make them more suitable for launching into smaller core optical fibers, i.e., SM fibers.

In recent years, the design and the technology of making SM VCSELs have reached the level that SM VCSELs can also have similar optical power to MM VCSELs. In addition, a SM VCSEL has a much narrower laser linewidth than a MM VCSEL, e.g., narrower than 0.2 nm, or in some cases narrower than 0.1 nm and in some cases even narrower than 0.07 nm. In contrast, MM VCSELs typically have laser linewidths ranging from 0.3 nm to 0.65 nm, which gives rise to chromatic dispersion effects that limit the bandwidth performance of the system when using MM fiber.

VCSELs for optical fiber data transmission typically operate around 850 nm, but VCSELs can be made to operate within a wavelength range between 850 nm and 1100 nm. In this wavelength range, a standard SM fiber designed for SM operation at wavelengths above 1300 nm can support a few modes. A SM or FM VCSEL can couple to such a fiber with relatively low insertion loss. However, the bandwidth of standard SM fibers within the 850 nm to 1100 nm wavelength range is too low to be suitable for high data rate transmission. To enable the SM or FM VCSEL transmission over a SM fiber, a SM fiber with bandwidth optimized for use in the wavelength range of 850 nm to 1100 nm is needed.

BRIEF SUMMARY

The present disclosure is directed to a system for measuring a modal delay and modal bandwidth and related methods for optical fibers operating in a few-moded regime.

Aspect 1 of the description is:
A method comprising:
transmitting an intensity-modulated light through a mode conditioner to generate a mode-conditioned intensity-modulated light;
transmitting the mode-conditioned intensity-modulated light through an optical fiber under test (FUT) to excite a plurality of modes of the optical FUT;
converting the mode-conditioned intensity-modulated light transmitted through the optical FUT into an electrical signal;
measuring, based on the electrical signal, a transfer function $S_{21}$ or a complex transfer function CTF(f) of the optical FUT based on at least on one pair of the plurality of modes;
calculating a modal delay time of the optical FUT based on the transfer function $S_{21}$ or the complex transfer function CTF(f); and
calculating a modal bandwidth of the optical FUT based on the modal delay time, the modal bandwidth being calculated for any given launch conditions of the plurality of modes.

Aspect 2 of the description is:
The method of Aspect 1, wherein the optical FUT has a length from 100 m to 16.5 km.

Aspect 3 of the description is:
The method of Aspect 1 or 2, wherein the plurality of modes consists of two modes, and wherein the at least one pair of modes consists of one pair of modes.

Aspect 4 of the description is:
The method of Aspect 1 or 2, wherein the plurality of modes consists of three or more modes, and wherein the at least one pair of modes consists of three or more pairs of modes.

Aspect 5 of the description is:
The method of any of Aspects 1-4, wherein the transfer function $S_{21}$ is based on a relative power ratio between the modes of the at least one pair of modes.

Aspect 6 of the description is:
The method of Aspect 5, wherein the calculating the bandwidth of the optical fiber comprises calculating a worst-case bandwidth in response to the launch conditions of the modes of the at least one pair of modes being equal.

Aspect 7 of the description is:
The method of Aspect 5, wherein the calculating the modal delay comprises fitting the transfer function $S_{21}$ using the following equation:

$$S_{21}=20*\log 10\{\sqrt{1+c^2+2c\cdot\cos[2\pi f(\tau_2-\tau_1)]}\}+d,$$

wherein c is the relative power ratio between the modes of the at least one pair of modes, and d is an optical loss of the optical FUT.

Aspect 8 of the description is:
The method of Aspect 5, wherein calculating the modal delay comprises fitting the transfer function $S_{21}$ using the following equation:

$$S_{21} = \frac{|\delta_1*\exp(-2\pi\delta_1^2 f^2)+c*\delta_2*\exp(-2\pi\delta_2^2 f^2)\exp[-i2\pi f(\tau_2-\tau_1)]|}{\delta_o*\exp(-2\pi\delta_o^2 f^2)} + d,$$

wherein c is the relative power ratio between the modes of the at least one pair of modes, d is an optical loss of the optical fiber, and $\delta_1$ and $\delta_2$ are the output pulse widths of the modes of the at least one pair of modes, respectively.

Aspect 9 of the description is:
The method of Aspect 5, wherein the calculating modal delay comprises fitting the transfer function $S_{21}$ using the following equation:

$$S_{21} = \sqrt{\sum_{j=1}^{n} a_j^2 + \sum_{j=1}^{n}\sum_{k \neq j, k=1}^{n} 2a_j a_k \cdot \cos[2\pi f(\tau_j - \tau_k)]},$$

wherein $a_j$ is the relative output powers in each mode compared to an input power, and $\tau_j$ is an absolute delay of the j-th mode.

Aspect 10 of the description is:
The method of Aspect 9, wherein calculating the bandwidth comprises calculating the bandwidth based on an overfill launch condition.

Aspect 11 of the description is:
The method of any of Aspects 1-10, wherein the optical FUT comprises an optical fiber operating at a wavelength between one of the wavelength ranges:
  750 nm to 1650 nm;
  850 nm to 1100 nm;
  1260 nm to 1360 nm; or
  1450 nm to 1600 nm.

Aspect 12 of the description is:
The method of any of Aspects 1-11, wherein the modal delay is based on extracting a frequency at a minimum value of the transfer function $S_{21}$ or based on an oscillation period of the transfer function.

Aspect 13 of the description is:
The method of Aspect 12, wherein the modal delay is based on two consecutive minimum or maximum values of the oscillation period.

Aspect 14 of the description is:
The method of any of Aspects 1-13, wherein:
  the measuring the transfer function $S_{21}$ or the complex transfer function CTF(f) comprises measuring the transfer function $S_{21}$ or the complex transfer function CTF(f) at multiple wavelengths over a wavelength range;
  calculating the modal delay comprises fitting the modal delay as a function of wavelength through a polynomial fitting over the wavelength range until the modal delay reaches a minimum value.

Aspect 15 of the description is:
The method of Aspect 14, wherein calculating the modal bandwidth comprises calculating the modal bandwidth based on fitted modal delay over the wavelength range.

Aspect 16 of the description is:
The method of Aspect 14 or 15, further comprising determining a peak wavelength when the modal delay reaches the minimum value.

Aspect 17 of the description is:
The method of any of Aspects 14-16, further comprising determining a peak wavelength when the modal bandwidth reaches the maximum value.

Aspect 18 of the description is:
A system comprising:
  a mode conditioner coupled to an input end of an optical fiber under test (FUT), the mode conditioner being configured to:
    condition an intensity-modulated light to generate a conditioned intensity-modulated light; and
    transmit the conditioned intensity-modulated through the optical FUT;
  a detector configured to convert the conditioned intensity-modulated light transmitted through the optical FUT into an electrical signal; and
  a measuring system configured to:
    receive the electrical signal from the detector;
    based on the electrical signal, measure a transfer function $S_{21}$ or a complex transfer function CTF(f) of the optical FUT based on at least on one pair of the plurality of modes;
    calculate a modal delay of the optical FUT based on the transfer function $S_{21}$ or the complex transfer function CTF(f); and
    calculate a bandwidth of the optical FUT based on the modal delay, the bandwidth being calculated for any given launch conditions of the plurality of modes.

Aspect 19 of the description is:
The system of Aspect 18, wherein the optical FUT has a length from 100 m to 16.5 km.

Aspect 20 of the description is:
The system of Aspect 18 or 19, wherein the plurality of modes consists of two modes, and wherein the at least one pair of modes consists of one pair of modes.

Aspect 21 of the description is:
The system of Aspect 18 or 19, wherein the plurality of modes consists of three or more modes, and wherein the at least one pair of modes consists of three or more pairs of modes.

Aspect 22 of the description is:
The system of any of Aspects 18-21, wherein the transfer function $S_{21}$ is based on a relative power ratio between the modes of the pair of modes.

Aspect 23 of the description is:
The system of Aspect 22, wherein the calculating the bandwidth of the optical fiber comprises calculating a worst-case bandwidth in response to the launch conditions of the modes being equal.

Aspect 24 of the description is:
The system of Aspect 22, wherein the calculating the modal delay comprises fitting the transfer function $S_{21}$ using the following equation:

$$S_{21} = 20 * \log 10\{\sqrt{1 + c^2 + 2c \cdot \cos[2\pi f(\tau_2 - \tau_1)]}\} + d,$$

wherein c is the relative power ratio between the modes of the at least one pair of modes, and d is an optical loss of the optical fiber.

Aspect 25 of the description is:
The system of Aspect 22, wherein the calculating the modal delay comprises fitting the transfer function $S_{21}$ using the following equation:

$$S_{21} = \frac{|\delta_1 * \exp(-2\pi\delta_1^2 f^2) + c * \delta_2 * \exp(-2\pi\delta_2^2 f^2)\exp[-i2\pi f(\tau_2 - \tau_1)]|}{\delta_o * \exp(-2\pi\delta_o^2 f^2)} + d,$$

wherein c is the relative power ratio between the modes of the at least one pair of modes, d is an optical loss of the optical fiber, and $\delta_1$ and $\delta_2$ are the output pulse widths of the respective modes of pair of modes.

Aspect 26 of the description is:
The system of Aspect 22, wherein the calculating modal delays comprises fitting the transfer function $S_{21}$ using the following equation:

$$S_{21} = \sqrt{\sum_{j=1}^{n} a_j^2 + \sum_{j=1}^{n}\sum_{k \neq j, k=1}^{n} 2a_j a_k \cdot \cos[2\pi f(\tau_j - \tau_k)]},$$

wherein $a_j$ is the relative output powers in each mode compared to the input power, and $\tau_j$ is the absolute delay of the j-th mode.

Aspect 27 of the description is:
The system of Aspect 26, wherein calculating the bandwidth comprises calculating the bandwidth based on an overfill launch condition.

Aspect 28 of the description is:
The system of any of Aspects 18-27, wherein the optical FUT comprises an optical fiber operating at a wavelength between one of the wavelength ranges:
750 nm to 1650 nm;
850 nm to 1100 nm;
1260 nm to 1360 nm; or
1450 nm to 1600 nm.

Aspect 29 of the description is:
The system of any of Aspects 18-28, wherein the modal delay is based on extracting a frequency at a minimum value of the transfer function $S_{21}$ or based on an oscillation period of the transfer function $S_{21}$.

Aspect 30 of the description is:
The system of Aspect 29, wherein the modal delay is based on two consecutive minimum or maximum values of the oscillation period.

Aspect 31 of the description is:
The system of any of Aspects 18-30, wherein the measuring system comprises a vector network analyzer.

Aspect 32 of the description is:
A measuring system comprising:
a first device configured to
measure a transfer function $S_{21}$ or a complex transfer function CTF(f) based on a mode-conditioned modulated light transmitted through an optical fiber comprising at least one pair of modes at an operating wavelength;
a second device configured to:
calculate a modal delay of the optical fiber based on the transfer function $S_{21}$ or the complex transfer function CTF(f); and calculate a bandwidth of the optical fiber based on the modal delay, the bandwidth being calculated for any launch conditions of the modes.

Aspect 33 of the description is:
A method comprising:
directing an input light signal having a first wavelength into an optical fiber under test (FUT), the optical FUT supporting a plurality of modes at the first wavelength, the plurality of modes comprising a first pair of modes, the input light propagating through the optical FUT to provide an output light signal;
determining a transfer function $S_{21}$ or a complex transfer function CTF(f) of the optical FUT at the first wavelength from a ratio of the output light signal to the input light signal; and
determining a modal delay time of the first pair of modes from the transfer function $S_{21}$ or the complex transfer function CTF(f).

Aspect 34 of the description is:
The method of Aspect 33, wherein the input light signal comprises intensity-modulated light.

Aspect 35 of the description is:
The method of Aspect 34, wherein the intensity-modulated light comprises mode-conditioned light.

Aspect 36 of the description is:
The method of any of Aspects 33-35, wherein the input light signal is characterized by a function $\hat{H}_{in}(f)$ in the frequency domain, the output light signal is characterized by a function $\hat{H}_{out}(f)$, f is frequency, and the transfer function $S_{21}$ is given by:

$$S_{21} = \left| \frac{\hat{H}_{out}(f)}{\hat{H}_{in}(f)} \right|.$$

Aspect 37 of the description is:
The method of Aspect 36, wherein the function $\hat{H}_{out}(f)$ is given by:

$$\hat{H}_{out}(f) = a_1 \cdot \hat{H}_{in}(f) \cdot \exp(-i \cdot 2\pi f \cdot \tau_1) + a_2 \cdot \hat{H}_{in}(f) \cdot \exp(-i \cdot 2\pi f \tau_2).$$

where $a_1$ is an output power of a first mode of the first pair of modes, $a_2$ is an output power of a second mode of the first pair of modes, $\tau_1$ is a modal time delay of the first mode of the first pair of modes, and $\tau_2$ is a modal time delay of the second mode of the first pair of modes.

Aspect 38 of the description is:
The method of Aspect 37, wherein the transfer function $S_{21}$ is given by:

$$S_{21} = \sqrt{a_1^2 + a_2^2 + 2a_1 \cdot a_2 \cdot \cos[2\pi f(\tau_2 - \tau_1)]},$$

where $a_1$ is an output power of a first mode of the first pair of modes, $a_2$ is an output power of a second mode of the first pair of modes, $\tau_1$ is a modal time delay of the first mode of the first pair of modes, and $\tau_2$ is a modal time delay of the second mode of the first pair of modes; or by:

$$S_{21} = 20 * \log 10\{\sqrt{1 + c^2 + 2c \cdot \cos[2\pi f(\tau_2 - \tau_1)]}\} + d$$

where c is the ratio between $a_2/a_1$ and d is a constant.

Aspect 39 of the description is:
The method of any of Aspects 33-38, wherein the first wavelength is between 800 nm and 1100 nm.

Aspect 40 of the description is:
The method of any of Aspects 33-39, wherein the plurality of modes comprises less than 6 modes.

Aspect 41 of the description is:
The method of any of Aspects 33-40, wherein the plurality of modes comprises three or more modes, the three or more modes including the first pair of modes and a second pair of modes, the method further comprising determining a modal delay time of the second pair of modes from the transfer function.

Aspect 42 of the description is:
The method of any of Aspects 33-41, wherein the optical FUT supports a single mode at wavelengths greater than a second wavelength, the second wavelength exceeding the first wavelength.

Aspect 43 of the description is:
The method of Aspect 42, wherein the second wavelength is 1260 nm or less.

Aspect 44 of the description is:
The method of any of Aspects 33-43, wherein the transfer function $S_{21}$ comprises a plurality of maxima and a plurality of minima and the determining modal delay time comprises determining a reciprocal of a frequency difference between two adjacent maxima or two adjacent minima or determining a frequency of one of the plurality of minima.

Aspect 45 of the description is:
The method of any of Aspects 33-44, further comprising determining a modal bandwidth from the modal delay time.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
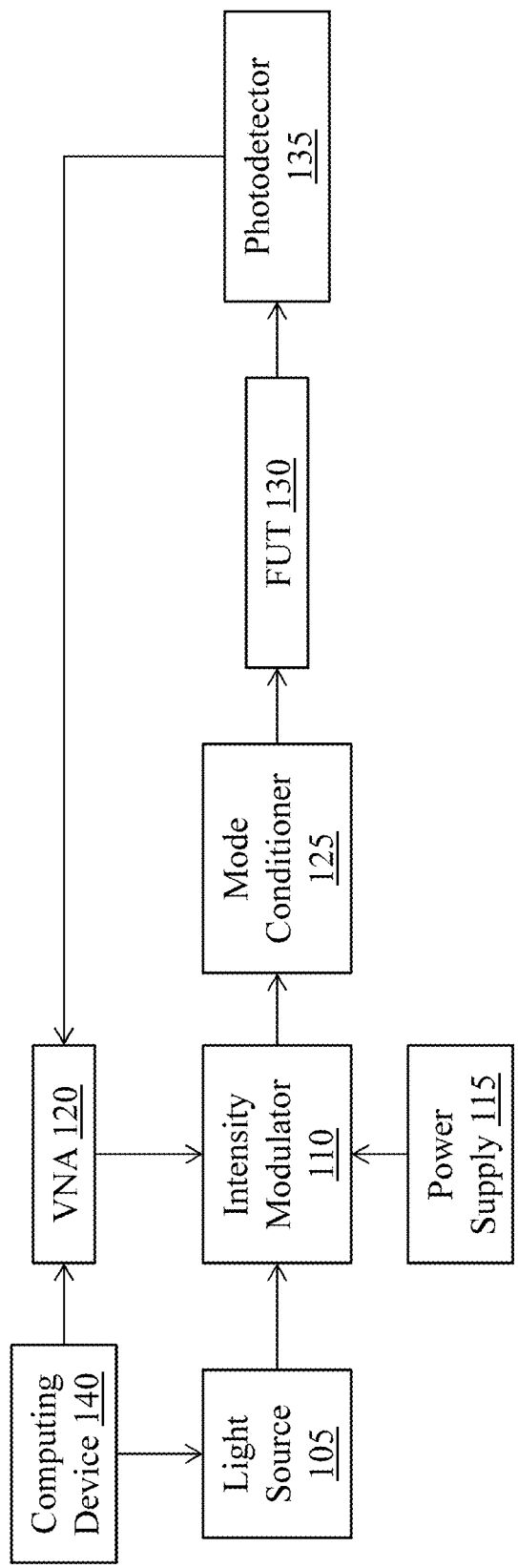
FIG. 1 illustrates an example system for measuring a modal delay and modal bandwidth, according to some embodiments.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

As used herein, "comprising" is an open-ended transitional phrase. A list of elements following the transitional phrase "comprising" is a non-exclusive list, such that elements in addition to those specifically recited in the list may also be present.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

The term "wherein" is used as an open-ended transitional phrase, to introduce a recitation of a series of characteristics of the structure.

Cartesian coordinates are used in some of the Figures for the sake of reference and ease of illustration and are not intended to be limiting as to direction or orientation. The z-direction is taken as the axial direction of the optical fiber.

The acronym VCSEL stands for "vertical cavity surface emitting laser."

The term "fiber" as used herein is shorthand for optical fiber.

The coordinate r is a radial coordinate, where r=0 corresponds to the centerline of the fiber.

The symbol "μm" is used as shorthand for "micron," which is a micrometer, i.e., $1 \times 10^{-6}$ meter.

The symbol "nm" is used as shorthand for "nanometer," which is $1 \times 10^{-9}$ meter.

The limits on any ranges cited herein are inclusive and thus to lie within the range, unless otherwise specified.

The terms "comprising," and "comprises," e.g., "A comprises B," is intended to include as a special case the concept of "consisting," as in "A consists of B."

As used herein, the term "few moded fiber" refers to a fiber supporting the propagation of more modes than a single mode fiber but fewer modes than a normal multimode fiber (i.e., 10 linear polarization (LP) modes or less). The number of propagating modes and their characteristics in a cylindrically symmetric optical fiber with an arbitrary refractive index profile may be obtained by solving a scalar wave equation. Each discrete solution from the scalar wave equation may represent a linear polarization mode LPmn, where m is the azimuthal index from the scalar wave equation, and n is the solution number for each azimuthal index m.

In some embodiments, light propagating through an optical fiber or other dielectric waveguide may form hybrid-type modes, which may also be referred to as LPmn modes. The LP0n modes have two polarization degrees of freedom and are two-fold degenerate, the LP1n modes are four-fold degenerate with two spatial and two polarization degrees of freedom, and the LPmn modes with m>1 are also four-fold degenerate. For example, in some embodiments, an optical fiber having the LP01 mode may propagate as a single-mode fiber, even though the LP01 mode may have two possible polarizations. In another example, a few-moded optical fiber having the L01 and LP11 modes propagates three spatial modes since the LP11 mode is two-fold degenerate, and each mode may have two possible polarizations, and thus the few-moded fiber may have a total of six (6) modes. Thus, a fiber having two LP modes may support the propagation of all of the LP01 modes and LP11 modes.

Some embodiments of the present disclosure are directed to a system for measuring a modal delay or modal delays between different modes to determine a modal bandwidth of an optical fiber, e.g., a few-moded fiber. In some embodiments, the number of modes may be between 2-5 modes at a wavelength of operation or measurement. The system may measure a transfer function of a fiber, e.g., a fiber, such as a bi-modal or few-moded fiber at the wavelength of measurement or operation, using a frequency domain method. Additionally, the fiber may be a step-index fiber or a graded-index fiber. In some embodiments, the fiber may operate at a wavelength between 850 nm and 1100 nm. In other embodiments, the fiber may operate at a wavelength between 1260-1360 nm (e.g., around 1310 nm) or at a wavelength between 1400-1600 nm (e.g., around 1550 nm). In some embodiments, for bi-modal fibers having a wavelength between 850 nm and 1100 nm, these fibers may be compliant with G.652 single mode fiber standard with cable cutoff wavelength equal to or lower than 1260 nm for single mode operation around 1310 nm and around 1550 nm etc. In some embodiments, when there are only two modes involved, the fiber may be subject to one modal delay between the two modes. In some embodiments, when there are more than two modes, the fiber may be subject to multiple modal delays among different modes.

Through the measured transfer function, a time delay between a pair of modes may be determined and a modal bandwidth for any launch condition may be calculated using the time delay. For example, in some implementations, a worst-case modal bandwidth (corresponding to the launch condition when both modes are equally excited) may be calculated even though the measurement may be done at a different launch condition. Using conventional measurement methods, the modal bandwidth may only be obtained for the specific launch condition used for the measurement. The ability to obtain the modal bandwidth for an arbitrary launch condition from a modal bandwidth measurement performed at a particular launch condition is one advantage of the present disclosure. The launch condition may include the power associated with each mode, e.g., the relative power excited/launched into each of a plurality of modes. Thus, the present disclosure describes techniques for calculating a modal delay time(s) and a modal bandwidth of a fiber based on the transfer function of the fiber. By using systems and methods described herein, the present disclosure can eliminate the need for expensive time-domain measurement instruments, such as a traditional differential mode delay (DMD) bench, which determines a "weighted" or "averaged" modal delay and bandwidth by measuring at multiple radial locations across the fiber core, used for measuring 50-micron core MM fibers.

The modal bandwidth of a fiber is defined as the capacity of an optical fiber measured in MHz*km or GHz*km. In some embodiments, the modal bandwidth can be obtained from the transfer function, and it may be the modulation frequency when the transmission through the fiber drops by 6 $dB_e$ (defined as 20*log 10(x)) (or 3 $dB_o$, which is defined as 10*log 10(x)) from the transmission value when modulation frequency is equal to 0 Hz.

FIG. 1 illustrates a system for measuring a modal delay time and bandwidth of an optical fiber, according to some embodiments. For example, a system 100 includes a light source 105, an intensity modulator 110, a power supply 115, a vector network analyzer (VNA) 120, a mode conditioner 125, a fiber under test (FUT) 130, an optical receiver 135 (e.g., a photodetector), and a computing device 140. In some embodiments, the VNA 120 may generate RF signals with frequencies sweeping over a frequency range to drive the intensity modulator 110 to convert the light from a light source 105 into intensity modulated optical signals for launching into the FUT 130. The optical signal may further pass through the mode conditioner 125 before launching into the FUT 130. After the optical signal propagates through the FUT 130, it may be received by the optical receiver 135, which may convert the optical signal(s) back into electric signal(s). The converted electrical signal(s) may be analyzed the VNA 120. For example, the VNA 120 may detect how the optical signal(s) changed or attenuated over the frequencies of the frequency sweep and as a result a transfer function may be obtained or measured.

In some embodiments, the light source 105 may be a super-luminescent diode, a laser configured to emit light at a select wavelength, a tunable laser, or the like. For example, the light source 105 may be a narrow linewidth light source (e.g., around 0.05 nm or less). The light source 105 may be configured to provide polarized light that is modulated by the intensity modulator 110.

In some embodiments, the computing device 140 may be electrically connected to the VNA 120 and the light source 105 to control the operation of the light source 105. In some embodiments, the computing device 140 and the VNA 120 may be a computing device, such as the example computing device illustrated in FIG. 9.

In some embodiments, the intensity modulator 110 may include at least two electric ports, which are respectfully used to receive a DC bias control voltage and frequency control signals. For example, the power supply 115, which sets the DC bias control voltage, may be electrically connected to a first electric port and the VNA 120 may be electrically connected to the second electric port. A modulating frequency provided by the intensity modulator 110 may be controlled by the VNA 120. For example, the VNA 120 may provide the frequency control signal to the intensity modulator 110 to sweep a modulation frequency over a frequency range. In some embodiments, the frequency range may be between 10 MHz to 30 GHz, between 100 MHz and 20 GHz, or between 100 MHz and 15 GHz. The frequency range may be set depending on the lengths of the fiber and the modal bandwidth that is measured. For example, the longer the optical fiber, the lower the upper frequency should be. And the higher the modal bandwidth needed to be measured, the higher the upper frequency should be. Thus, the frequency control signal from VNA 120 may be used to control intensity modulator 110, such that the intensity modulator 110 converts light from the light source 105 into intensity-modulated light to be used as intensity-modulated optical signals for launching into FUT 130. In some embodiments, the intensity modulator 110 may be a lithium-niobate-based modulator.

In some embodiments, the intensity-modulated light from the intensity modulator 110 may be provided to the mode conditioner 125. The mode conditioner 125 may be configured to change launching conditions of the light. In some embodiments, the mode conditioner 125 may be an off-the-shelf device. An example commercial mode conditioner 125 may generate a Gaussian light intensity profile radially across the FUT 130. The launch conditions from this type of multi-mode mode conditioner 125 may be similar to the launch conditions from a VCSEL. In other embodiments, the mode conditioner 125 may be a customized device that is designed to provide select launch conditions for various types of lasers and optics. For example, the mode conditioner 125 may be an offset-based mode conditioner configured to provide essentially arbitrary launch conditions to replicate the launch conditions that can occur between a light source and a fiber. That is, the modulated light exits the mode conditioner 125 as mode-conditioned intensity-modulated light.

In some embodiments, the mode conditioner 125 may be optically coupled to the FUT 130, such that the mode-conditioned intensity-modulated light enters the FUT 130 through a first end as a guided wave and exits the FUT 130 at a second end. The FUT 130 may have a length of, for example, 1 km or less. Alternatively, the FUT 130 may have a length of, for example, greater than 1 km. The output light from the FUT 130 may be detected by the optical receiver 135.

Figure 2A:
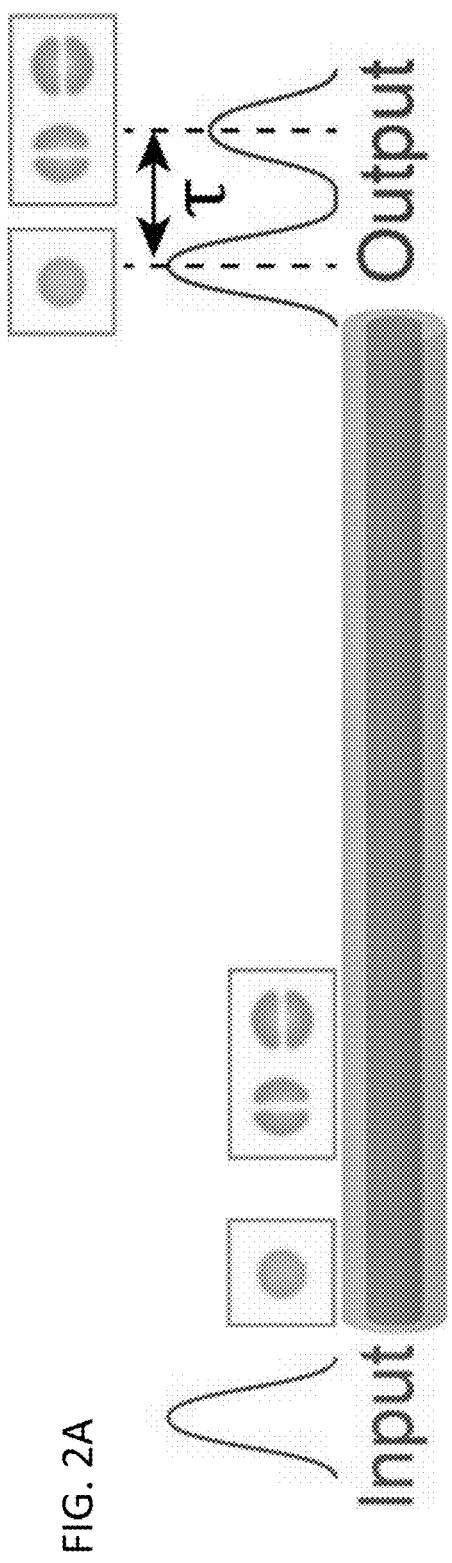
FIGS. 2A and 2B illustrate example modes based on an input into an optical fiber that supports two or more modes, according to some embodiments.
Figure 2B:
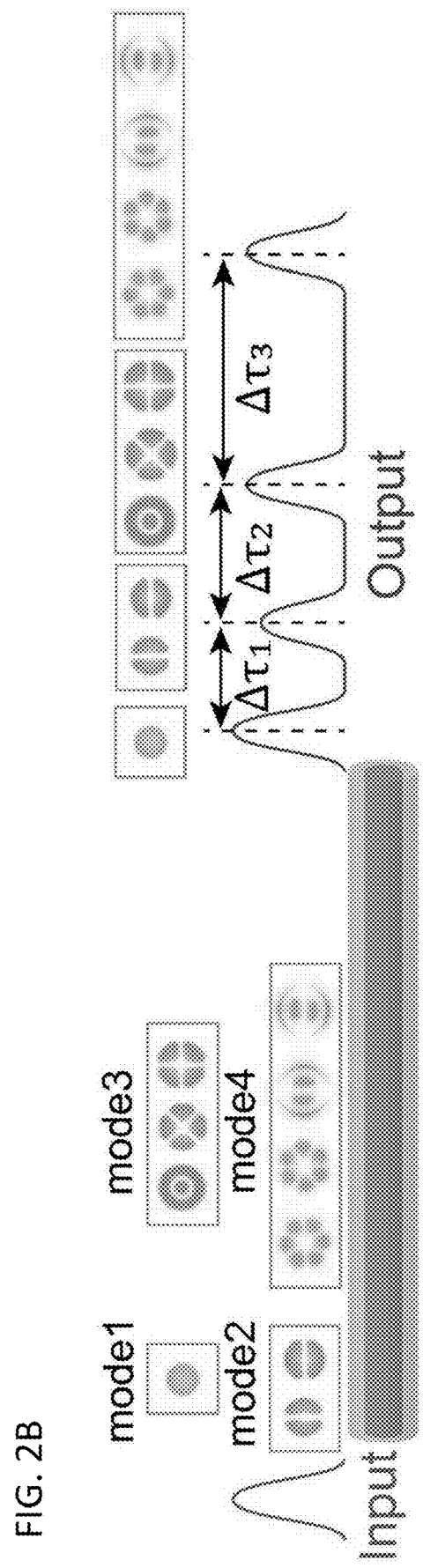

In some embodiments, the light input to the FUT 130 may include one pulse of light, as illustrated in FIGS. 2A and 2B (with characteristics depicted in FIGS. 2C-2G as described below). In other embodiments, the light output from the FUT 130 may include two or more pulses of light resulting from the different propagation constants of a pair of modes, e.g., a first mode and a second mode, as illustrated in FIG. 2A. It should be understood by those of ordinary skill in the arts that more than two pulses of light may be outputted by the FUT 130. That is, the FUT 130 may include a plurality of pairs of modes.

In some embodiments, the output light from the FUT 130 may be detected by optical receiver 135, which may convert the pulse(s) of output light into, for example, an electrical signal(s). In some embodiments, the optical receiver may be, for example, a photodetector. In some embodiments, the electrical signal(s) may be amplified either within photodetector 135 or by an external amplifier (not shown). The electrical signal(s) may then be provided to and analyzed by the VNA 120. For example, in some embodiments, the VNA 120 may calculate a transfer function of the FUT 130 based on a pair of modes of the FUT 130. In the illustrative example depicted in FIG. 2A, two modes are launched simultaneously into an optical fiber as a single input pulse. The modes propagate through the FUT 130 with different propagation constants. A delay between the modes develops and the output pulses for the modes are detected at different times. The modal delay time $\tau$ between the output pulses of the two modes may be expressed as a difference $\tau=|\tau_2-\tau_1|=\tau_0 \cdot L$, with $\tau_1$ and $\tau_2$ being the times of detection of the two modes at the output of the FUT 130 relative to the time of launch (also referred to as the modal delay time of each of the modes) and with $\tau_0$ being a normalized modal delay time (modal delay per unit length) and L being the length of the FUT 130. The normalized modal delay time may be measured in ps/m or ns/km.

In the following description, the input signal is denoted by $H_{in}(t)$ in the time domain and $\hat{H}_{in}(f)$ in the frequency domain, with $\hat{H}_{in}(f)$ being the Fourier transform of $H_{in}(t)$, and the output signal of the FUT 130 is denoted by $H_{out}(t)$ and $\hat{H}_{out}(f)$ in the time domain and frequency domain, respectively. Using these values, the VNA 120 may calculate the transfer function of the FUT 130 using equation (1):

$$S_{21} = \left| \frac{\hat{H}_{out}(f)}{\hat{H}_{in}(f)} \right| \tag{1}$$

In some implementations, the FUT 130 may support two modes, and the following description applies to bi-modal fibers. However, it should be understood by those of ordinary skill in the arts that the following description may apply to each pair of modes in a few-moded fiber according to aspects of the present disclosure. In some implementations, the FUT 130 may be short (e.g., 1 km or less), and as such, polarization mode dispersion, chromatic mode dispersion, and other effects of the FUT 130 may be assumed to be negligible. In such implementations, only the modal delay is important and the output signal can be calculated using equation (2):

$$H_{out}(t) = a_1 \cdot H_{in}(t-\tau_1) + a_2 \cdot H_{in}(t-\tau_2) \tag{2}$$

where $a_1$ and $a_2$ may be the output powers or relative output powers in each mode compared to the input power and $\tau_1$ and $\tau_2$ may be the modal delay time of each mode. In some implementations, the Fourier transform of the output signal given in equation (2) may be determined using equation (3):

$$\tilde{H}_{out}(f) = a_1 \cdot \tilde{H}_{in}(f) \cdot \exp(-i \cdot 2\pi f \tau_1) + a_2 \cdot \tilde{H}_{in}(f) \cdot \exp(-i \cdot 2\pi f \tau_2) \quad (3)$$

Using the Fourier transform of the output pulse, the transfer function $S_{21}$ may be determined using equation (4):

$$S_{21} = \left| \frac{\tilde{H}_{out}(f)}{\tilde{H}_{in}(f)} \right| = |a_1 \cdot \exp(-i \cdot 2\pi f \tau_1) + a_2 \cdot \exp(-i \cdot 2\pi f \tau_2)| = \sqrt{a_1^2 + a_2^2 + 2a_1 \cdot a_2 \cdot \cos[2\pi f(\tau_2 - \tau_1)]} \quad (4)$$

In some embodiments, the transfer function $S_{21}$ is applicable to any two-mode cases regardless of the input signal shape. The transfer function $S_{21}$ may be rewritten in decibel (dB) units using equation (5):

$$S_{21} = 20 * \log 10 \{\sqrt{1 + c^2 + 2c \cdot \cos[2\pi f(\tau_2 - \tau_1)]}\} + d \quad (5)$$

where $c = a_2/a_1$ (i.e., the relative power ratio) and d is related to the optical loss.

Figure 3B:
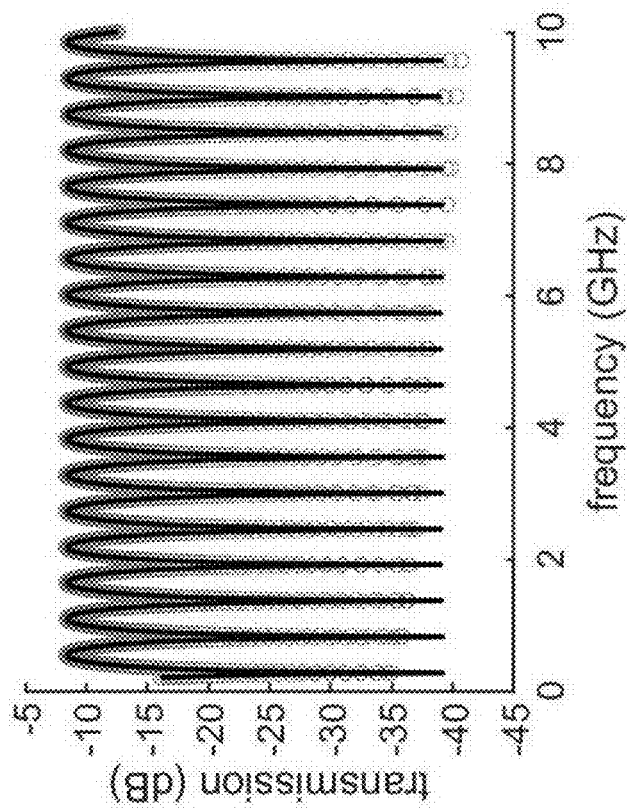
FIGS. 3A-3D illustrate experimental and modeled transfer functions, according to some embodiments.
Figure 3A:
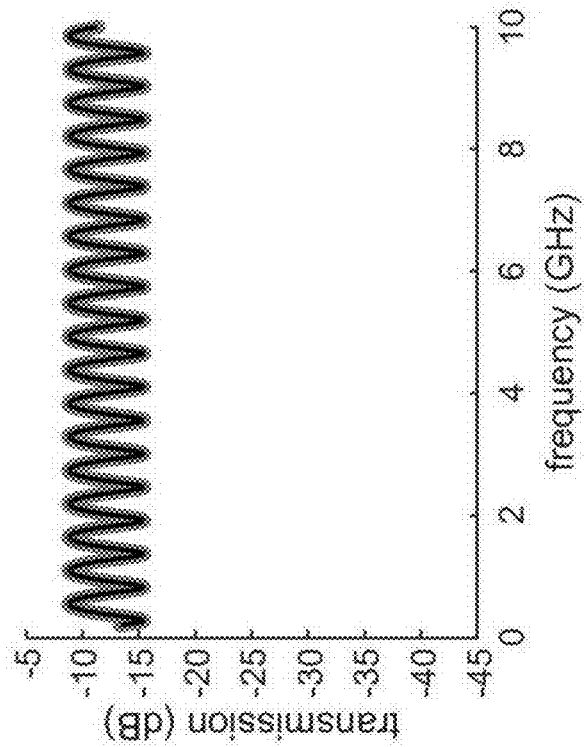
Figure 3D:
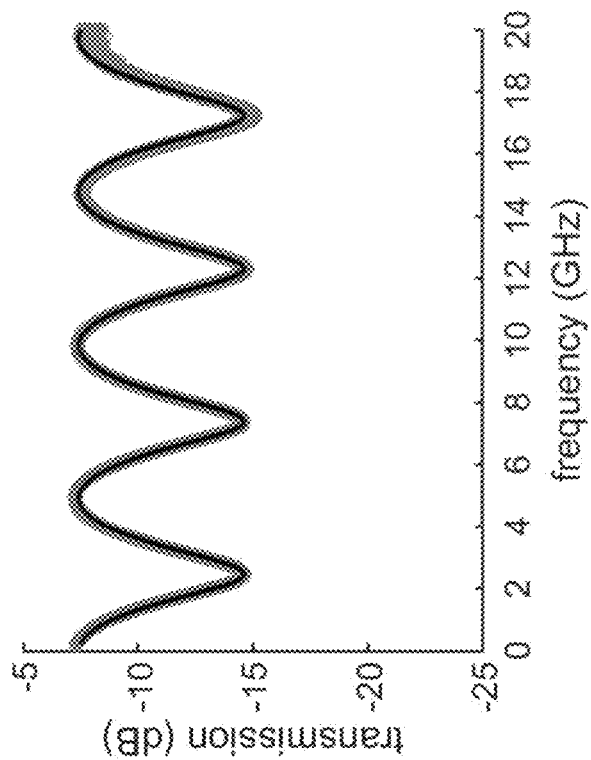
Figure 3C:
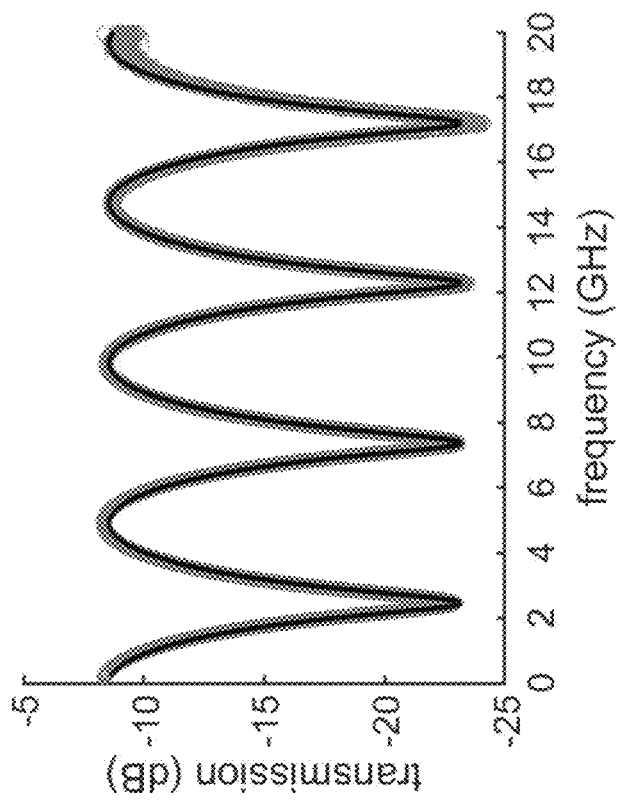

FIGS. 3A-3D illustrate experimental and modeled transfer functions (expressed as transmission in units of dB), according to some embodiments. Specifically, FIGS. 3A and 3B illustrate experimental and modeled transfer functions of an example step-index single-mode fiber operated under two different launch conditions, and FIGS. 3C and 3D illustrate experimental and modeled transfer functions of an example graded-index single-mode fiber operated under two different launch conditions. The modeled transfer function was determined by fitting Equation (5) to the experimental data obtained using the experimental system shown in FIG. 1. As illustrated in FIGS. 3A-3D, the modelled transfer function is in good agreement with the experimental results for both the step-index fiber and the graded-index fiber.

Figure 7:
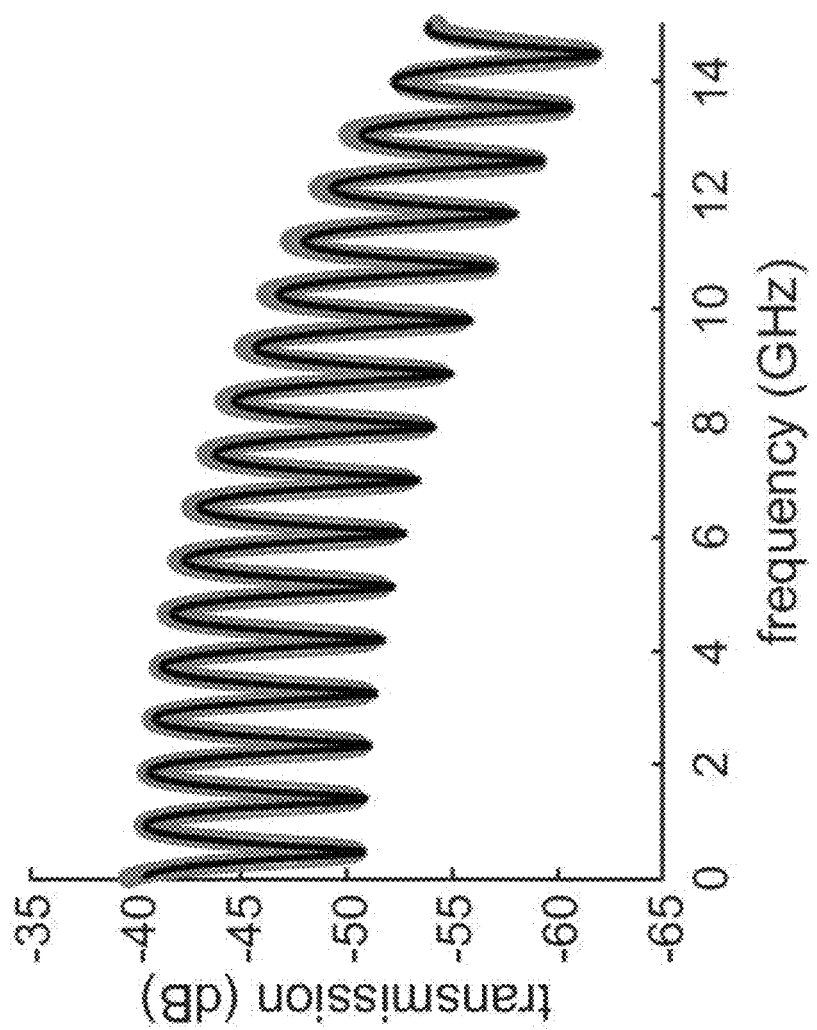
FIG. 7 illustrates experimental and modeled transfer functions considering pulse broadening effects, according to some embodiments.

In some embodiments, the FUT 130 may be long (e.g., more than 1 km), and as such, broadening effects caused by the FUT 130 may be taken into consideration. For example, FIG. 7 illustrates the measured transfer function of a 6.65 km fiber, and shows that the transfer function exhibits an overall decrease with increasing frequency, which may be caused by pulse broadening effects such as polarization mode dispersion. To account for these broadening effects, assuming a Gaussian input pulse $$H_{in}(t) = \exp\left(-\frac{\tau^2}{2\delta_o^2}\right)$$

with two modes, the transfer function may be calculated using equation (6):

$$S_{21} = \frac{|\delta_1 * \exp(-2\pi\delta_1^2 f^2) + c * \delta_2 * \exp(-2\pi\delta_2^2 f^2)\exp[-i2\pi f(\tau_2 - \tau_1)]|}{\delta_o * \exp(-2\pi\delta_o^2 f^2)} + d, \quad (6)$$

where $\delta_1$ and $\delta_2$ are the output pulse widths of the respective modes of a pair of modes.

Figure 4:
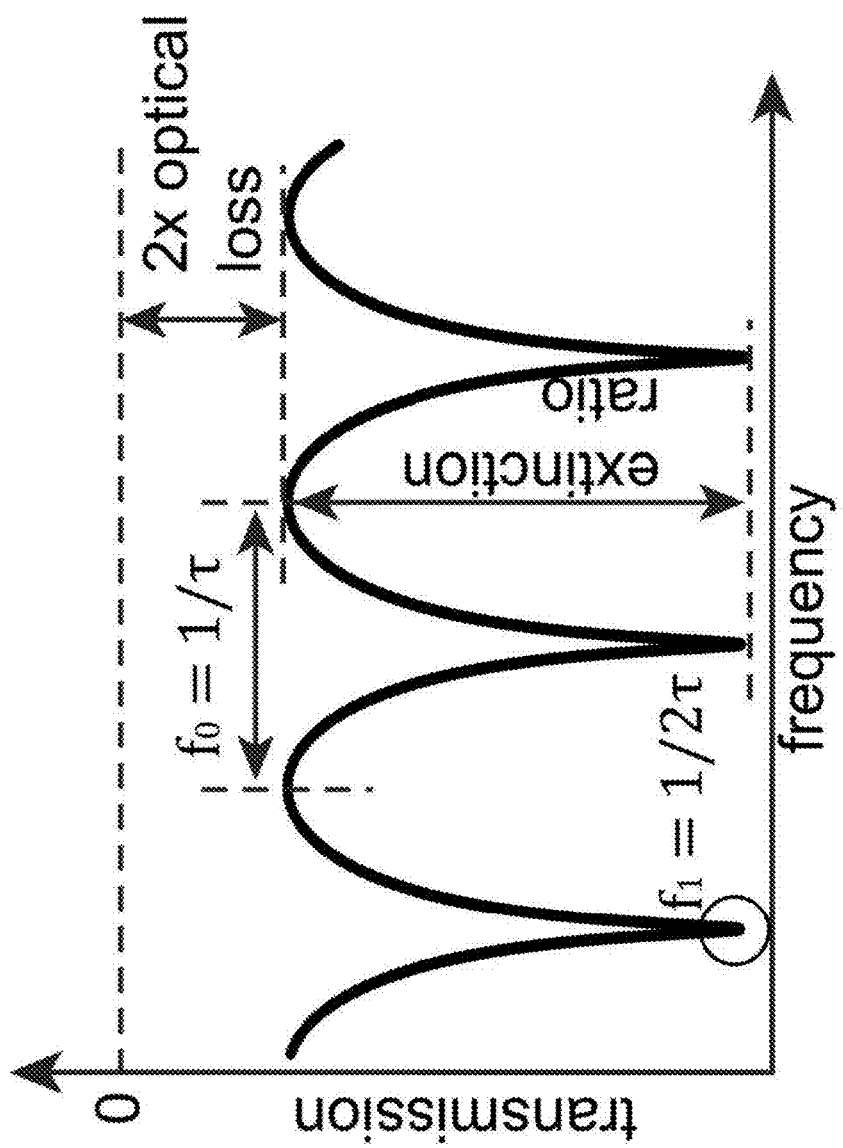
FIG. 4 illustrates an example transfer function and characteristics of the transfer function, according to some embodiments.

Using the transfer function, the computing device 140 may determine the modal delay time $\tau = |\tau_2 - \tau_1|$ based on either a minimum value of the measured transfer function, an oscillation period of the measured transfer function, or by fitting the measured transfer function with Eq. (4-6), as illustrated in FIG. 4. For example, based on either equation (5) or equation (6), the frequency of the first minimum of the transfer function, which is based on the modal delay time $\tau$, may be calculated using equation (7):

$$f_1 = \frac{1}{2\tau}. \quad (7)$$

And the oscillation period of the transfer function or the separation between two consecutive minimum values or maximum values, which is likewise based on the modal delay time $\tau$, may be calculated using equation (8):

$$f_0 = \frac{1}{\tau}. \quad (8)$$

As further illustrated in FIG. 4, a modulation depth (or extinction ratio (ER)), which corresponds to a difference between a maximum value and a minimum value of the transfer function, may also be determined based on the transfer function. For example, the ER (in units of dB) may be calculated using equation (9):

$$ER = 20 * \log 10\left(\frac{|1-c|}{|1+c|}\right). \quad (9)$$

Lastly, as illustrated in FIG. 4, a maximum value of the transfer function may be related to the optical loss of the FUT 130.

Figure 5:
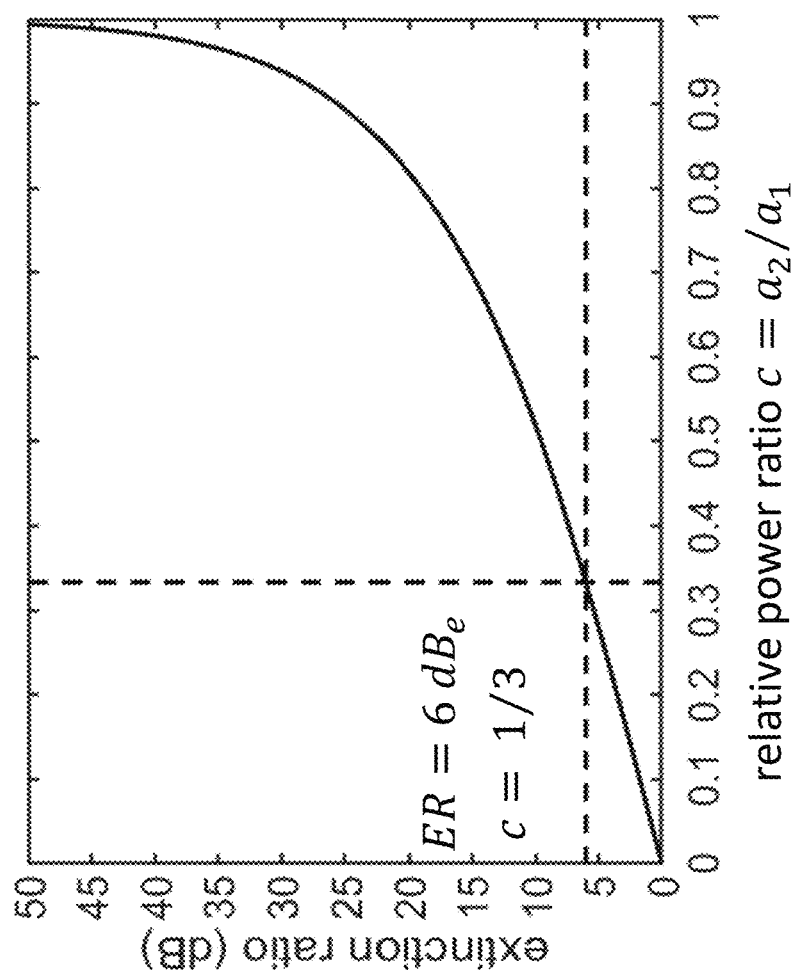
FIG. 5 illustrates a graphical representation of the extinction ratio based on a power ratio of a pair of modes of an optical fiber, according to some embodiments.

FIG. 5 illustrates a graphical representation of the extinction ratio ER as a function of parameter c based on equation (9), according to some embodiments. In the example illustrated in FIG. 5, when c<1/3, the extinction ratio ER is less than <6 $dB_e$ (defined as 20*log 10(x)) (or 3 $dB_o$, which is defined as 10*log 10(x)), and as a result, the computing device 140 cannot directly determine a modal bandwidth of the FUT 130. However, the VNA 120 may use a Gaussian fit to extend the transfer function to 6 $dB_e$ point to obtain the modal bandwidth for this launch condition.

The product of a modal bandwidth and a modal delay time $\tau$ ("tau") as a function of the parameter c can be described using equation (10), for the cases when c≥1/3, according to some embodiments.

$$f_{3dB_o} * \tau = \frac{1}{2\pi} * \arccos\left(\frac{2c - 3 - 3c^2}{8c}\right) \quad (10)$$

Figure 6:
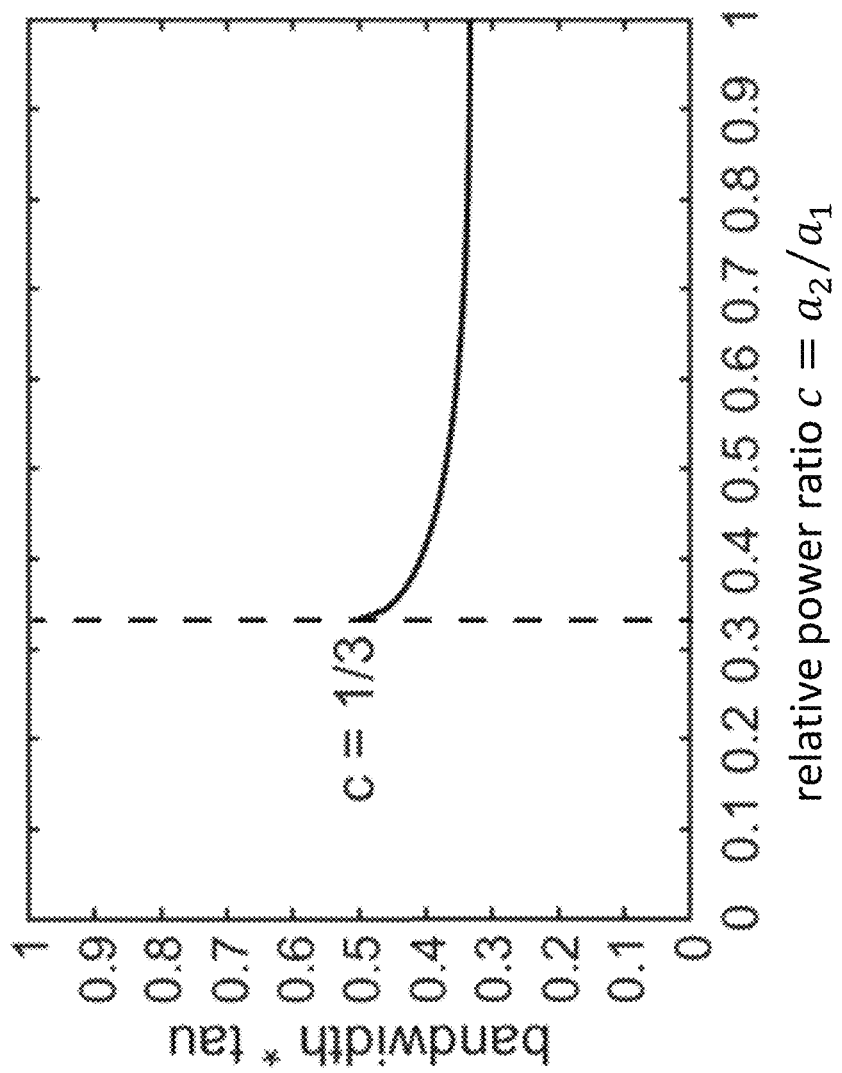
FIG. 6 illustrates a graphical representation of a product of a modal bandwidth and a modal delay based on the power ratio, according to some embodiments.

FIG. 6 illustrates a graphical representation of the product of a modal bandwidth and a modal delay time $\tau$ ("tau") as a function of the parameter c, according to some embodiments. In some instances, when c is equal to 1/3, the modal bandwidth may be calculated using equation (11):

$$f_{3dB_O} = \frac{1}{2\tau} \quad (11)$$

In some embodiments, the modal bandwidth may be calculated using a coefficient other than 1/2 in equation (11), for example, a value between 1/2 and 1/3 may be used to reflect system performance for other practical cases, e.g. c is greater than 1/3. In some embodiments, the modal bandwidth-delay time product may increase with c decreasing, and 6 $dB_e$ (or 3 $dB_o$) ER cannot be reached. In such cases, the computing device 140 may calculate the modal bandwidth by fitting the data to a Gaussian function to extend the data to the point when 6 $dB_e$ (or 3 $dB_o$) can be reached. In some embodiments, a minimum modal bandwidth-delay time product may be achieved when c=1 (i.e., when both modes are equally excited), with the minimum modal bandwidth being calculated using equation (12):

$$f_{3dB\_min} = \frac{1}{3\tau}. \quad (12)$$

Thus, according to some embodiments, the VNA 120 may measure a transfer function for a plurality of modes launched into the fiber. The computing device 140 may calculate a modal-delay time(s) based on the transfer function(s), and calculate a modal bandwidth based on the modal delay time(s), with the bandwidth being calculated for any launch conditions of the modes. In some embodiments, the modal delay time may be based on a minimum value of the transfer function or an oscillation period of the transfer function, as shown in FIG. 4. In some embodiments, the modal bandwidth may be a worst-case modal bandwidth when the launch conditions for each mode of a pair of modes are the same (c=1). Therefore, the systems and methods of the present disclosure may dramatically reduce the fiber bandwidth measurement times, and unlike the DMD test bench, may only require obtaining one transfer function.

Figure 10:
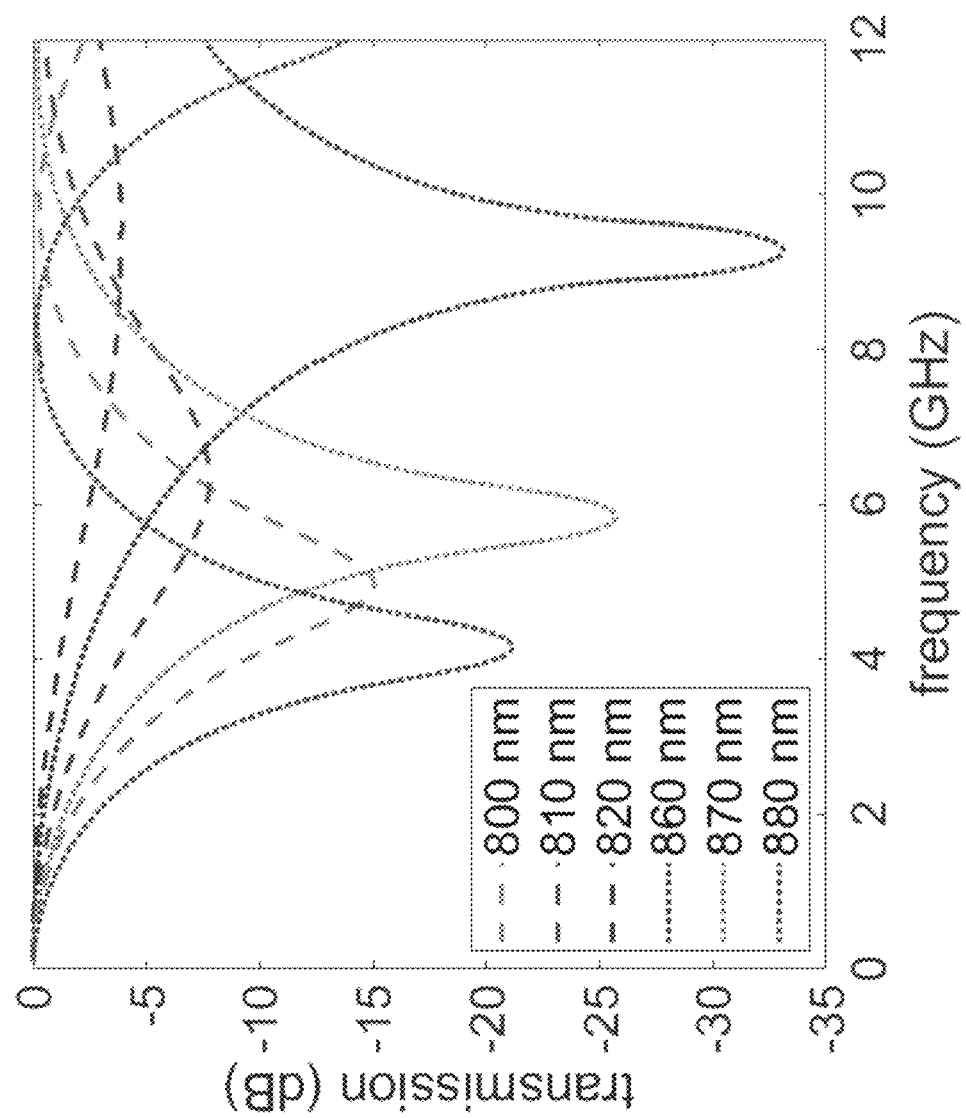
FIG. 10 illustrates examples of the measured transfer functions of the same fiber at different wavelengths.
Figure 11:
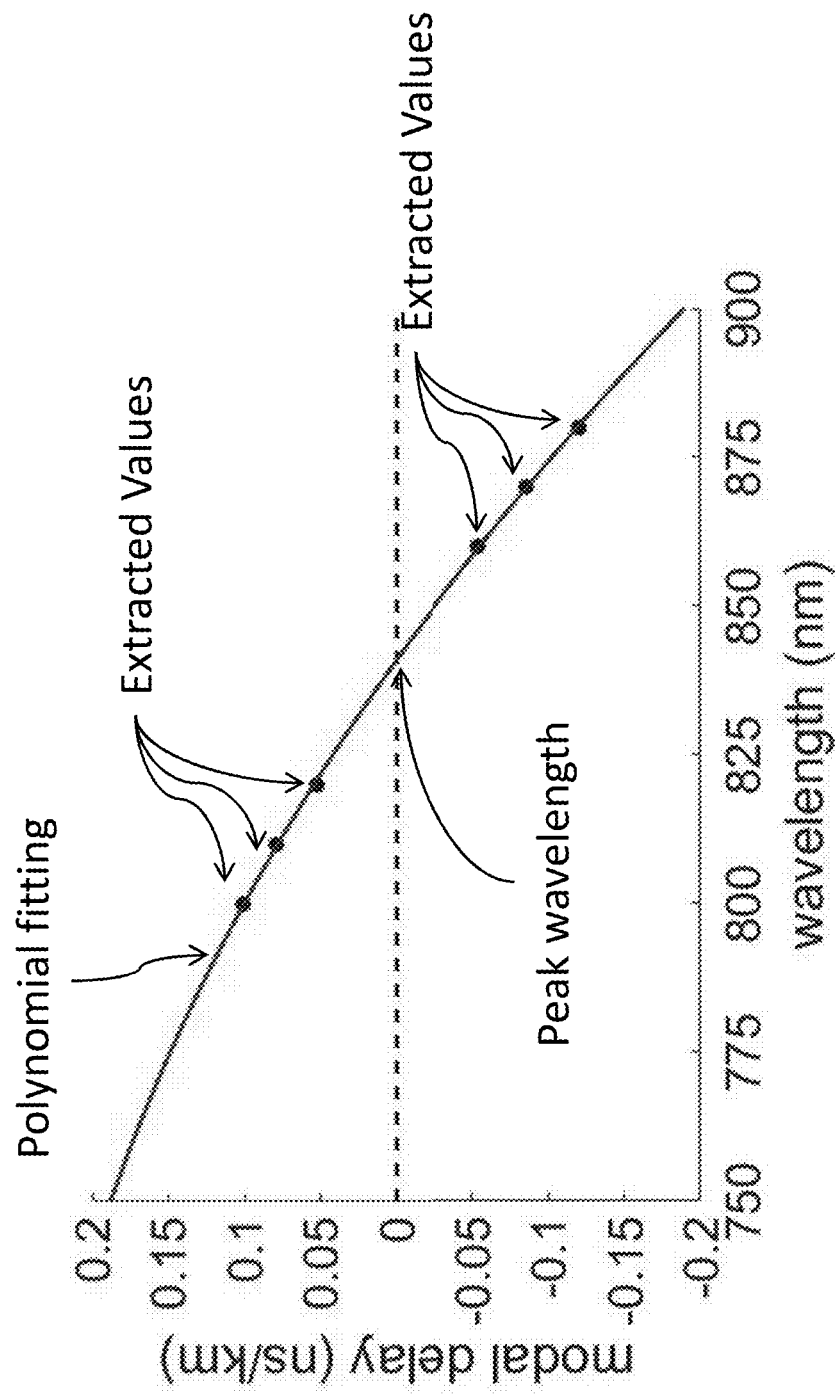
FIG. 11 illustrates example extracted modal delays from the measured transfer functions, according to some embodiments.

In some embodiments, a frequency domain measurement and modal delay time/modal bandwidth calculation methodology may be used to calculate the modal delay time and modal bandwidth information at multiple wavelengths. For example, FIG. 10 illustrates example transfer functions of the same fiber at different wavelengths, e.g., between 800-880 nm. In some embodiments, the modal delay times of the same FUT 130 may be extracted at each wavelength based on the method described herein, as shown in FIG. 11, which illustrates example extracted modal delay times from the measured transfer functions. As illustrated in FIG. 11, the dots may be extracted modal delay times from the measured transfer function, and the curve may be a polynomial fitting of the modal delay times as a function of wavelength. In some embodiments, a second order polynomial fitting may be used to achieve good agreement between the modal delay time and the wavelength, although higher order polynomial fittings may also be used in accordance with embodiments of the present disclosure. In some embodiments, the modal delay time may be negative, defined as $\tau=\tau_2-\tau_1$, while the modal delay time extracted with equation (7) or (8) is the absolute value $|\tau|=|\tau_2-\tau_1|$. To simplify the data fitting, in some embodiments, the sign of the modal delay time may be adjusted when the absolute value of the modal delay time starts to increase with wavelength. As further illustrated in FIG. 11, the peak wavelength may be determined through the fitting curve of the modal delay as a function of wavelength. In some embodiments, the peak wavelength may be defined as the wavelength at which the modal bandwidth reaches its maximum or when the absolute value of the modal delay time reaches its minimum. For example, the peak wavelength may be the wavelength when the fitted curve crosses the value of 0. In the example shown in FIG. 11, the peak wavelength is about 840 nm.

Figure 12:
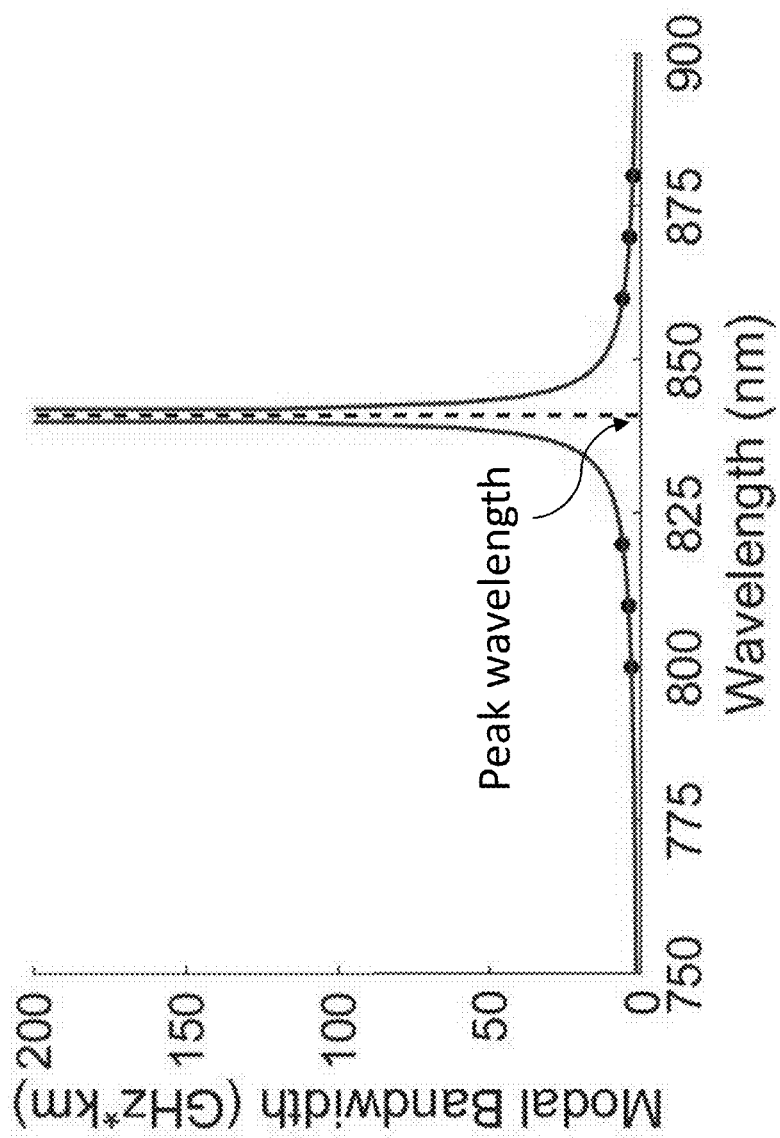
FIG. 12 illustrates an example worst-case modal bandwidth as a function of wavelength, according to some embodiments.

In further embodiments, the computing device 140 may calculate the worst-case modal bandwidth as a function of wavelength using equation (12) and the extracted or fitted modal delay time as a function of wavelength as described above. FIG. 12 illustrates an extracted worst-case modal bandwidth from the measured data (illustrated using dots) as well as the fitting data (illustrated using the curve) calculated from the fitted modal delay time as a function of wavelength. In some embodiments, FIG. 12 may also be used to extract the peak wavelength of the FUT 130. For example, as shown in FIG. 12, the peak wavelength may be the wavelength at which the modal bandwidth reaches its maximum, as indicated by the vertical dashed line.

In some embodiments, the equations may be generalized for a fiber supporting a plurality of modes, for example n modes with n being greater than 1. For example, the output pulses in the time domain may be described using equation (13):

$$H_{out}(t) = a*H_{in}(t-\tau_1) + a_2*H_{in}(t-\tau_2) + \\ a_3*H_{in}(t-\tau_3) + \ldots + a_n*H_{in}(t-\tau_n) = \sum_{j=1}^{n} a_j*H_{in}(t-\tau_j), \quad (13)$$

with $a_j$ being the output powers or relative output powers in each mode compared to the input power and $\tau_j$ being the absolute delay of the j-th mode. Based on equation (13), the transfer function may be written as illustrated in equation (14):

$$S_{21} = \left|\frac{\hat{H}_{out}(f)}{\hat{H}_{in}(f)}\right| = \left|\sum_{j=1}^{n} a_j*\exp(-i*2\pi f \tau_j)\right| = \\ \sqrt{\sum_{j=1}^{n} a_j^2 + \sum_{j=1}^{n}\sum_{k \neq j, k=1}^{n} 2a_j a_k \cdot \cos[2\pi f(\tau_j - \tau_k)]} \quad (14)$$

As such, the transfer function may be measured and the modal delay times between different modes may be obtained by fitting the above equation. In some embodiments, the fitting may be done with a few modes, and a person of ordinary skill in the arts would understand that it would be increasingly difficult to perform the fitting as the number of modes increases. Thus, in some embodiments, the number of modes may be limited to five (5) modes or less, and in further embodiments, the number of modes may be limited to three (3) modes or less. Using the extracted delay, the VNA 120 may measure the transfer function based on any launch conditions. For example, in some embodiments, the VNA may measure the transfer function based on an overfill launch condition, e.g., when all modes are equally excited. In some embodiments, the overfill launch condition may be used to calculate the worst-case modal bandwidth.

Figure 13A:
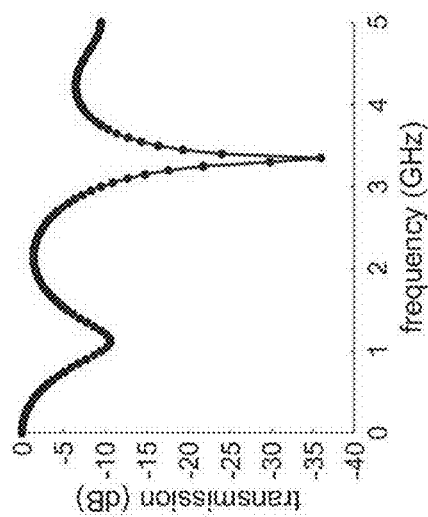
FIGS. 13A-C illustrate example transfer functions for an optical fiber under different launching conditions, according to some embodiments.
Figure 13B:
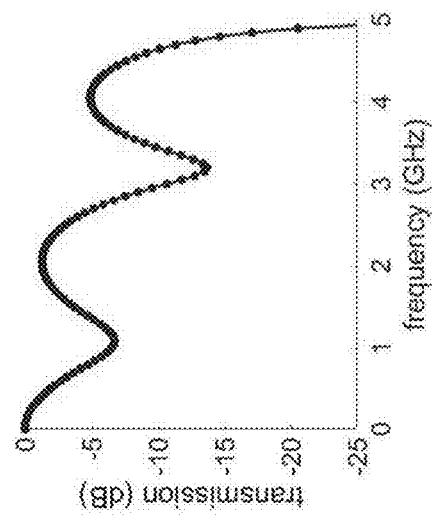
Figure 13C:
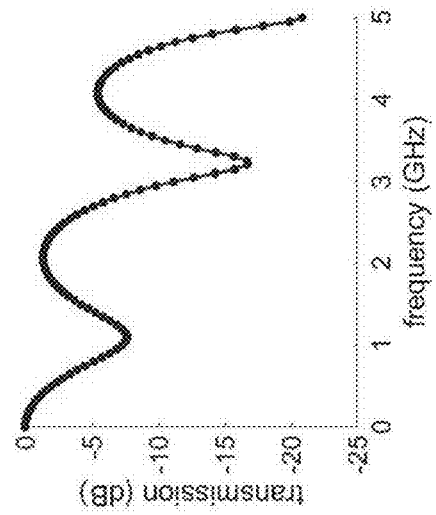

FIGS. 13A-C illustrate example transfer functions for an optical fiber under different launching conditions. For example, as shown in FIG. 13A, $\tau_1=0$ ns/km, $\tau_2=0.1$ ns/km, $\tau_3=0.5$ ns/k, and $a_1=0.5$, $a_2=0.3$, $a_3=0.3$, and based on these values, the modal bandwidth may be calculated as 0.875 GHz*km using equation (13). However, as shown in FIG. 13B, with $a_1$=0.4, $a_2$=0.2, $a_3$=0.2, the modal bandwidth may be calculated as 0.93 GHz*km using equation (13). Lastly, as shown in FIG. 13C, to obtain the overfill bandwidth, $a_1$=$a_2$=$a_3$=1.0, and the overfill bandwidth may be calculated as 0.8 GHz*km using equation (13).

Table I illustrates measurement results of a normalized modal delay time and worst-case modal bandwidth of example fibers at 850 nm.

TABLE I

| Fiber ID | Fiber | Normalized modal delay time (ns/km) | Worst-case modal bandwidth (GHz · km) |
|---|---|---|---|
| Fiber 1 | Step-index | 1.83 | 0.18 |
| Fiber 2 | Graded-index | 0.0066 | 48.3 |
| Fiber 3 | Graded-index | 0.16 | 2.08 |
| Fiber 4 | Graded-index | 0.32 | 1.03 |
| Fiber 5 | Graded-index | 0.085 | 3.93 |
| Fiber 6 | Graded-index | 0.2 | 1.64 |
| Fiber 7 | Graded-index | 0.023 | 14.3 |

Thus, as illustrated in Table I, some graded-index fibers may have very high modal bandwidth (e.g., greater than 10 GHz·km) in the 850 nm wavelength window, which may be suitable for few-mode transmission in data center applications.

In some embodiments, the VNA 120 may be calibrated without the FUT 130 in the system 100, which is set to be 0 for the whole frequency range used to test the system. In this way, when the FUT 130 is connected in the system 100, the VNA 120 may determine a normalized transfer function, which only takes into account the contribution from the FUT 130. The method has been previously used for measuring modal bandwidth of multimode fibers at multiple wavelengths as described in U.S. Pat. No. 9,377,377, the contents of which are hereby incorporated by reference in their entirety. In some embodiments of the present disclosure, the systems and methods described herein may be used to extract the modal delay time(s) for individual pairs of modes for few-moded fibers and therefore can define the modal bandwidth at arbitrary launching condition using the measured transfer function from one single launching condition or one single measurement.

In Eq. (14) the transfer function $S_{21}$ refers to the amplitude/magnitude of the complex transfer function (abbreviated as CTF(f)) defined in Eq. (15) below. This is what the VNA measures and displays in most cases. Using Eq. (14), we have extracted modal delay and modal bandwidth information for two mode fibers and three mode fibers. The method described above, which fits the transfer function $S_{21}$ (magnitude of the complex transfer function) to extract the modal delay information for the few-moded fibers, become more difficult when the number of modes in the fiber increases. We have further advanced our method to not only use the magnitude $S_{21}$ of the complex transfer function, but also the complex transfer function CTF(f). Due to the modal delay difference between different modes in the few-moded fiber, the complex transfer function CTF(f) of the few-modes fiber takes the form of, $$CTF(f) = \frac{\hat{H}out(f)}{\hat{H}in(f)} = \sum_{j=1}^{n} a_j * \exp(-i*2\pi f \tau_j) \quad (15)$$

The complex transfer function CTF(f) here describes the full transmission link illustrated in FIGS. 2A and 2B, but can be generalized to few-moded fiber with more modes involved. The delay $\tau_j$ is the absolute modal delay time of j-th mode traveling from the input of the fiber to the output of the fiber. In FIGS. 2A and 2B the transmission concept is illustrated in the context of an optical pulse launched into the fiber and transmit through the full length to get to the other end of the fiber for two mode fiber in FIG. 2A and for few-mode fiber such as with four modes in FIG. 2B. The VNA can measure the complex transfer function CTF(f) without using the optical pulse concept, as it functions as a frequency domain instrument. The full operating principle is explained in the book: Joel P. Dunsmore, "Handbook of Microwave Component Measurements with Advanced VNA Techniques", 2012 John Wiley & Sons, Ltd.

With the complex transfer function CTF(f) available, we can then do a Fourier transform to get the time-domain information. As the complex transfer functions were sampled at certain frequency intervals, to fully resolve the time domain information without causing aliasing or ambiguity of the modal delay time $\tau_j$, the frequency step, df needs to meet the following condition, $$\max(\tau_1, \ldots \tau_n) \leq 1/df \quad (16)$$

where df is related to the frequency span $\Delta f$ and number of sampling points (NOP) as follows, $$df = \Delta f/(NOP-1) \quad (17)$$

Without meeting this condition, the discrete Fourier transform will not fully resolve the absolute modal delays. In Eq. (15) there are cosine and sine terms: $\cos(2\pi f \tau_j)$ and $\sin(2\pi f \tau_j)$. When the data are under-sampled, which means the sampling points NOP is not large enough, there is an ambiguity on determining the value of $\tau_j$ through discrete Fourier or inverse Fourier transformation. The peak value in the Fourier spectrum can take the value of, $$\tau_j = \frac{k}{df} \pm t_j \quad (18)$$

where k is an integer, $t_j$ is the time position of the peaks after the inverse Fourier transform. We can figure out the correct absolute modal delay or finding the proper k to de-alias the signals. This can be done by estimating the rough absolute modal delay of the link and find the integer in Eq. (18) that is nearest to the estimated value. The absolute modal delay can also be obtained by measuring a shorter piece of the fiber sample with sufficient sampling meeting Eq. (16) and determine the absolute modal delay by scaling the value to longer fiber length. However, when df satisfies the condition in Eq. (16), such ambiguity disappears. For a fiber with 200 m length and group refractive index around 1.45, the absolute modal delay is around 967 nanoseconds. If we choose a frequency span of 10 MHz to 8 GHz, the NOP required without incurring aliasing is around 7727. In some cases, since our main interest is to resolve the relative modal delay between different modes, aliasing is not an issue in direct using the Fourier transform for the purpose to resolve the relative modal delays between different modes. Therefore, it becomes straightforward to obtain the modal delay information by doing a simple Fourier transformation.

The discrete Fourier transform of a vector $X=\{x_j\}=\{x_1, x_2 \ldots x_N\}$ into another vector $Y=\{y_k\}=\{y_1, y_2 \ldots y_N\}$ such that $Y=(X)=\mathcal{F}(X)=\text{fft}(X)$, and correspondingly the inverse Fourier transform of Y into X so that $X=\mathcal{F}^{-1}(Y)=\text{ifft}(Y)$, are defined as:

$$Y(k) = \sum_{j=1}^{N} X(j) \cdot e^{\frac{-i2\pi(j-1)(k-1)}{N}} \quad (19)$$

$$X(j) = \frac{1}{N}\sum_{k=1}^{N} Y(k) \cdot e^{\frac{i2\pi(j-1)(k-1)}{N}} \quad (20)$$

Where N is the length of the vector.

Figure 2C:
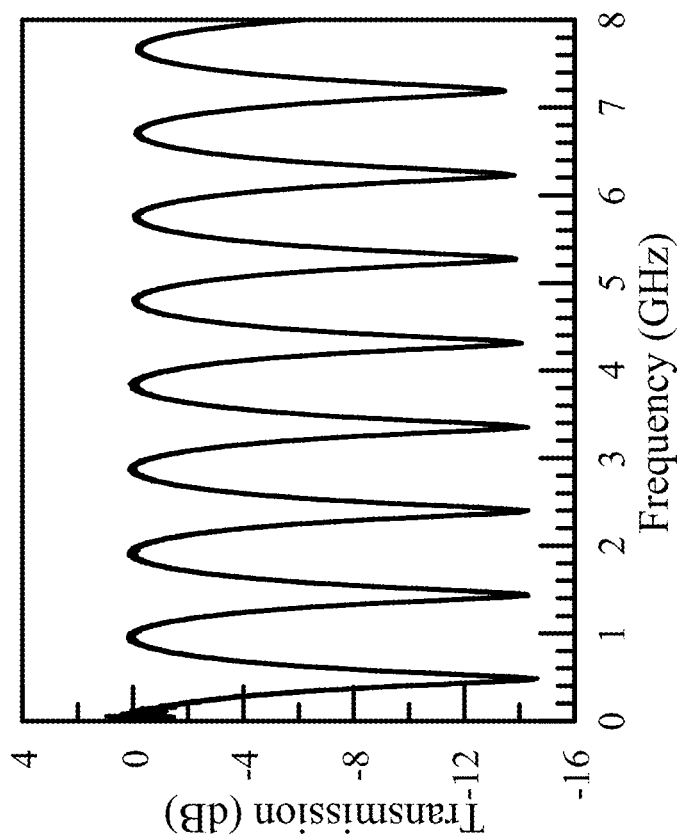
FIG. 2C shows the measured S21 or magnitude of the CTF of a 200 m fiber sample.
Figure 2D:
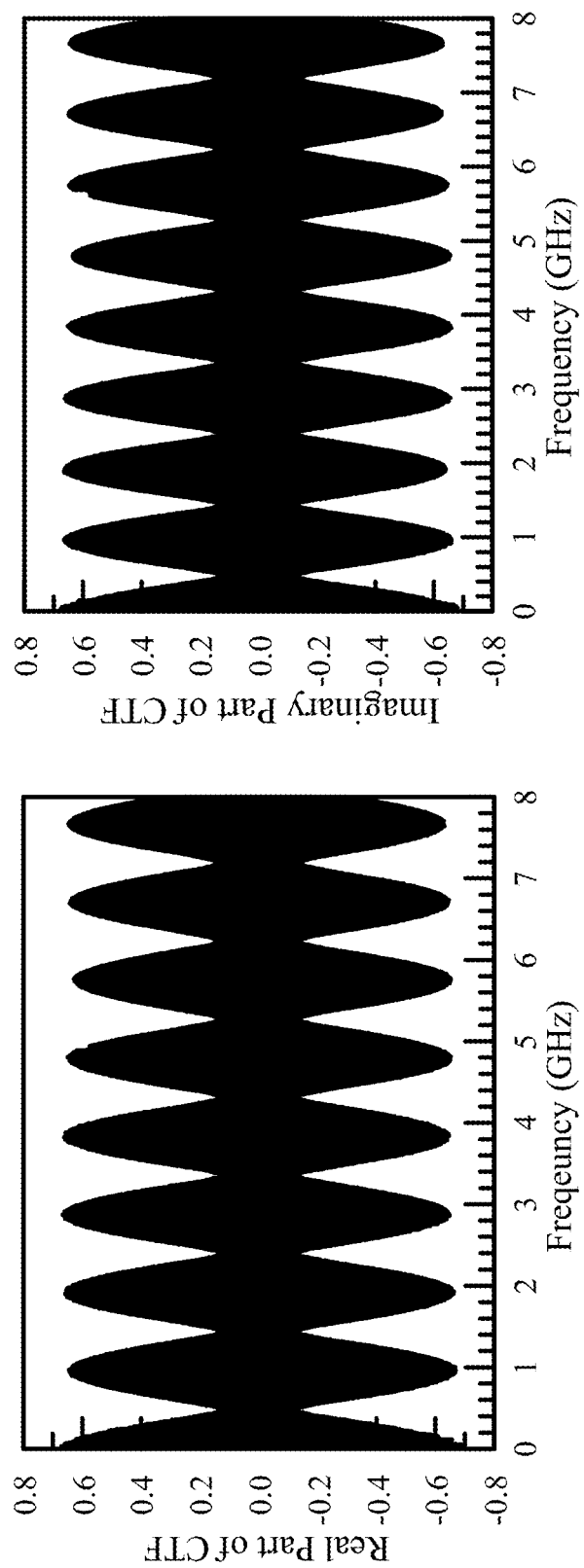
FIG. 2D shows the real and imaginary parts of the CTF of a 1000 m fiber.

To illustrate the above principle, we have measured a 1000 m step-index single mode fiber. The fiber is single-mode fiber at wavelength above 1260 nm. At wavelengths far below 1260 nm, it is a two-mode fiber. We measured the transmission of the fiber which is the magnitude of transfer function at 980 nm as shown in FIG. 2C. The real and imaginary part of the complex transfer function CTF(f) are shown in FIG. 2D. The frequency span is from 10 MHz to 8 GHz with totally 16001 data points sampled.

In FIG. 2C, the lowest transmission is at 0.4794 GHz. Using Eq. (7), it is determined that the relative modal delay between two modes is 1.043 ns. We also obtained the complex transfer function CTF(f) for the same fiber under the same launch condition and show the real and imaginary part of the complex transfer function CTF(f) in FIG. 2D.

Figure 2E:
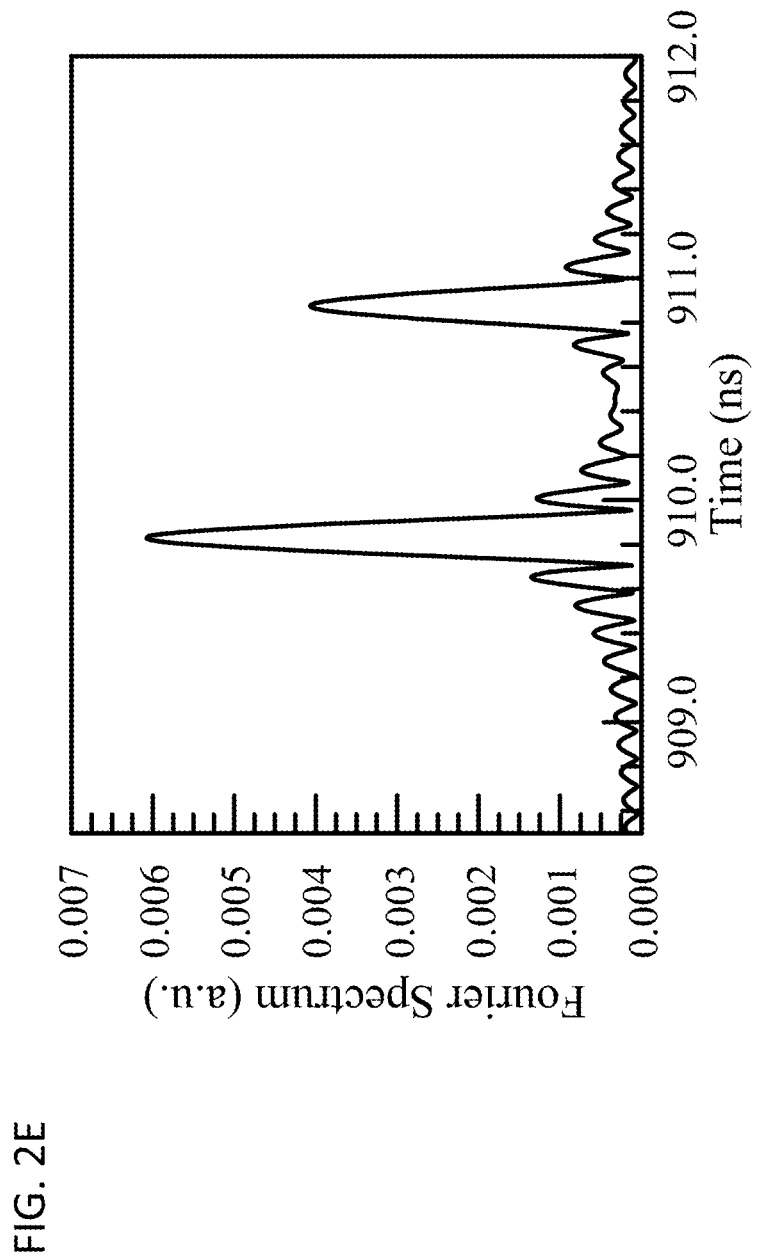
FIG. 2E shows the inverse Fourier transform of the CTF in FIG. 2D.
Figure 2F:
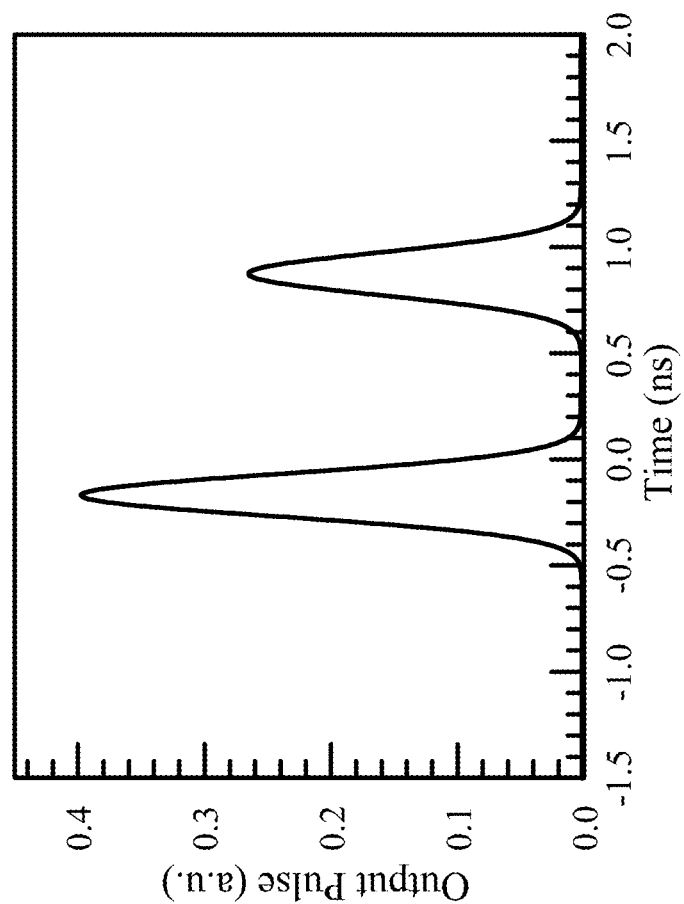
FIG. 2F shows output pulses generated from Eq. (23) for selected embodiments.
Figure 2G:
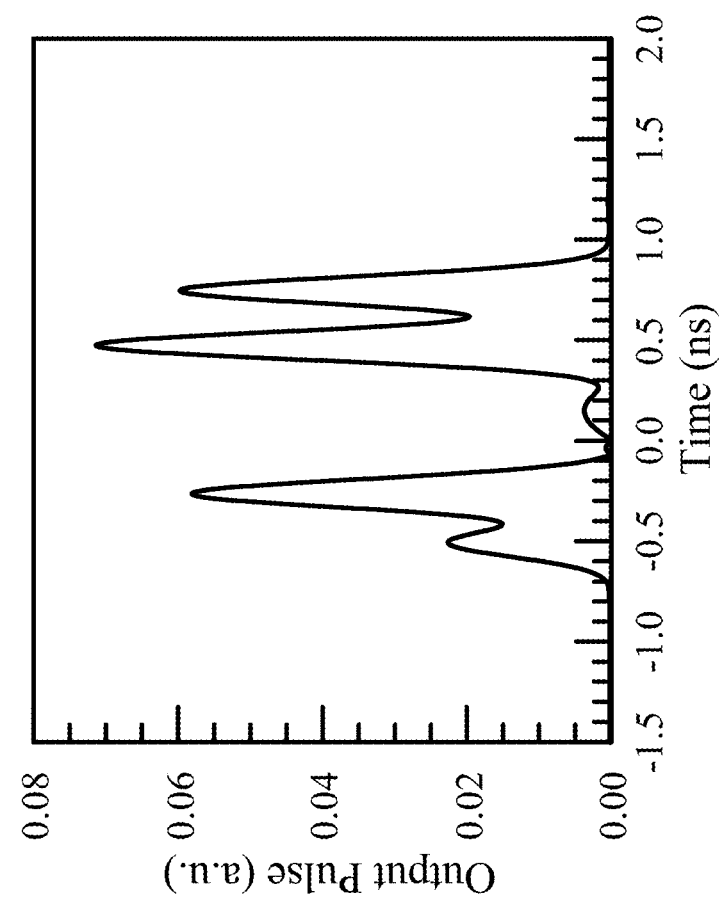
FIG. 2G shows the output pulse of an embodiment of a four-mode fiber at 1310 nm generated using Eq. (23).

We show the inverse discrete Fourier transform for the complex transfer function CTF(f) illustrated in FIG. 2D and show the magnitude of the results in FIG. 2E. Although the sampling points are not sufficient for fully resolving the absolute modal delays of the 1000 m fiber for each mode, the modal delay can still be figured out correctly. The separation of the two peaks in FIG. 2E is 1.042 ns, which agrees very well with the method using Eq. (7) as extracted from the first minimal of the transmission data or magnitude $S_{21}$ of the complex transfer function CTF(f).

In doing the Fourier transform, we have padded the complex transfer function CTF(f) to add more data points for the complex transfer function CTF(f). In the VNA, we can set the NOP points with the frequency span of $\Delta f$. If we use the same NOP for the Fourier transform, the time domain resolution is $1/\Delta f$. Using above example of NOP of 16001 points and $\Delta f$ of 14.99 GHz, we have the time resolution of 0.067 ns or 67 ps. This resolution is apparently too poor for resolving time domain features at picosecond scale. A resolution of sub-picosecond is preferred. If we pad zeros to end of the complex transfer function CTF(f) obtained from VNA to increase the number of points by 100 times, we can increase the time resolution by a factor of 100 to 0.67 ps.

In FIG. 2E, there are oscillations in the data after the inverse Fourier transform. This is the result of frequency sampling with certain cutoff. It essentially places a rectangle filter to the complex transfer function CTF(f) before doing the inverse Fourier transform. There are forms of the filters, for example, using Hamming filter, Hann filter and Bohman filter to reduce the oscillation in the Fourier transformed signals. One method that has physical meaning is to use the Fourier transform from a Gaussian Pulse as the filter and virtually assume it is the input pulse into the fiber. The Gaussian pulse take the form of Eq. (21), $$P_{in}(t)=e^{-t^2/(2w^2)} \quad (21)$$

where w is the pulse width, which is typically in the range from 50-150 ps. Since the Gaussian pulse has a frequency roll-off, it behaves like a filter.

For the complex transfer function CTF(f) when it is under-sampled or when the NOP is not large enough, we can transform it to cancel the fast oscillating term due to the large absolute delay of the modes to obtain a transformed complex CTF'(f) for modal delays, which is different from the original complex transfer function CFT(f) only by a phase term as shown in Eq. (22):

$$\text{CFT}'(f)=e^{i2\pi\tau_0 f}\cdot\text{CTF}(f) \quad (22)$$

where $\tau_0$ is the absolute modal delay of the fiber or a value near or the same as absolute modal delay for one of the modes. As noted above, we can figure out the absolute modal delay by estimating the rough absolute modal delay of the link and find proper integer value in Eq. (18) that is nearest to the estimated value. We then multiply the transformed complex transfer function CTF'(f) with the inverse Fourier transform of the Gaussian pulse and then perform a Fourier transform, as shown in Eq. (23), to obtain the output pulse of the transmission link, $$P_{out}(t)=\mathcal{F}(\text{CTF}'(f)*\mathcal{F}^{-1}(P_{in}(t))) \quad (23)$$

Compared to the real output pulse, this calculated output pulse using the transformed complex transfer function CFT'(f) preserves the overall shape, and the only difference is a shift in time. Since the relative modal delays between different fiber modes are the key properties that are of interest, this overall time shift does not impact the measurement. We have applied Eq. (23) to the fibers shown in FIGS. 2C-2E and obtained the output pulse as shown in the FIG. 2F. The separation of the two split pulses is 1.044 ns, again very close to the results obtained in two other methods.

With the above validation, we then measured a few-moded fiber with 4 modes at 1310 nm. The light is launched from a single mode fiber and some offset between the two fibers is generated to excite all modes in the few-moded fiber. Using Eq. (23), we obtained the results shown in FIG. 2G. There are four pulses observed with the location at −0.51 ns, −0.26 ns, 0.47 ns and 0.75 ns. The neighboring modes have modal delay differences of 0.25 ns, 0.73 ns and 0.28 ns. This example illustrates the capability to measure the modal delays for few-moded fiber with four modes. The method is capable of measuring fibers with many modes, for example, up to 5 modes, up to 10 modes, up to 15 modes and even up to 20 modes or more.

Figure 8:
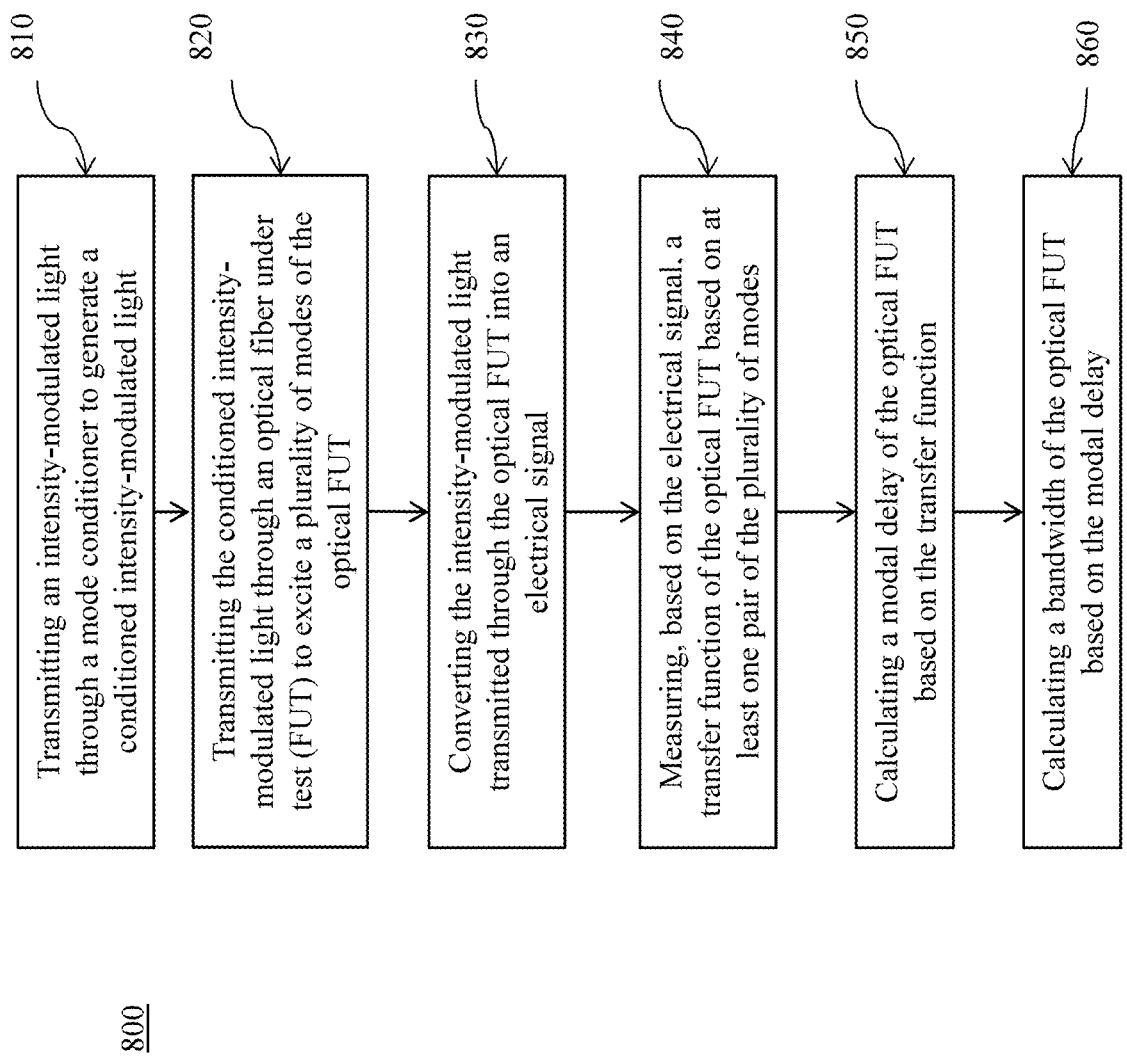
FIG. 8 illustrates an example method for measuring the modal delay and modal bandwidth, according to some embodiments.

FIG. 8 illustrates a method for measuring a modal delay time and a modal bandwidth of an optical fiber, according to some embodiments. The method may include transmitting an intensity-modulated light (optical signal) through a mode conditioner, such as the mode conditioner 125 shown in FIG. 1, to generate a mode-conditioned intensity-modulated light at step 810. In some embodiments, prior to transmitting the light through the mode conditioner, the method may also include emitting polarized light through a fiber (other than the FUT) connected to a light source at a select wavelength within a wavelength range and intensity-modulating the polarized light over a range of frequencies. In some embodiments, the frequency of the intensity-modulated light may be swept over a frequency range by a VNA, such as the VNA 120 shown in FIG. 1. The method may also include transmitting the mode-conditioned intensity-modulated light through an optical FUT, such as the FUT 130 shown in FIG. 1, to excite a plurality of modes of the optical FUT at step 820. In some embodiments, the optical FUT may support a plurality of modes, with the number of modes resulting in a different number of pairs of modes. For example, when there are three modes (e.g., A, B, and C), there are three modal delay times that can be obtained (e.g., one for each of pairs A-B, B-C, and A-C). However, when there are only two modes (e.g., A and B), there is only one modal delay time (A-B).

The method may also include converting the mode-conditioned intensity-modulated light transmitted through the optical FUT into an electrical signal at step 830. The method may also include measuring, based on the electrical signal, a transfer function of the optical FUT based on at least on one pair of the plurality of modes at step 840. The method may include calculating a modal delay time of the optical FUT based on the transfer function at step 850 and calculating a bandwidth of the optical FUT based on the modal delay time at step 860. The bandwidth may be calculated for any given launch conditions of the plurality of modes.

Figure 14:
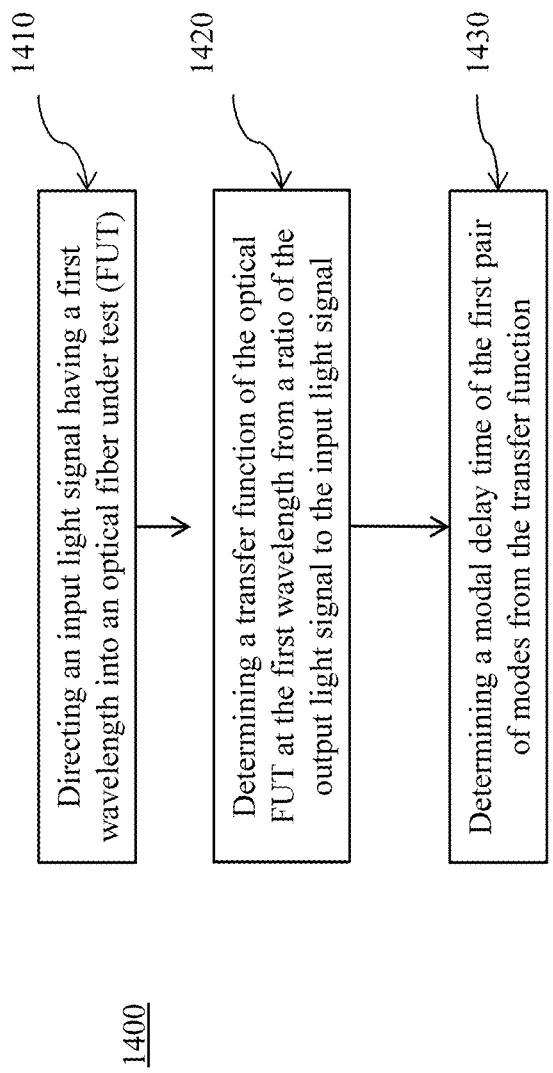
FIG. 14 illustrates an example method for measuring the modal delay, according to some embodiments.

FIG. 14 illustrates another method for measuring a modal delay time, according to some embodiments. The method may include directing an input light signal having a first wavelength into an optical fiber under test (FUT) 1410. In some embodiments, the optical FUT may support a plurality of modes at the first wavelength and the plurality of modes may include a first pair of modes. Additionally, the input light may propagate through the optical FUT to provide an output light signal. In some embodiments, the input light signal may include intensity-modulated light. In further embodiments, the intensity-modulated light may include mode-conditioned light. In some embodiments, the plurality of modes may include less than six (6) modes. In further embodiments, the plurality of modes includes three or more modes, and the three or more modes may include the first pair of modes and a second pair of modes, and the method may further include determining a modal delay time of the second pair of modes from the transfer function. In some embodiments, the optical FUT may support a single mode at wavelengths greater than a second wavelength (e.g., 1260 nm or less), and the second wavelength may exceed the first wavelength. The method may further include determining a transfer function of the optical FUT at the first wavelength from a ratio of the output light signal to the input light signal 1420. The method may also include determining a modal delay time of the first pair of modes from the transfer function 1430. In some embodiments, the transfer function may include a plurality of maxima and a plurality of minima, and the determining the modal delay time comprises determining a reciprocal of a frequency difference between two adjacent maxima or two adjacent minima or determining a frequency of one of the plurality of minima. In still further embodiments, the method may also include determining a modal bandwidth from the modal delay time.

Each of the servers and modules described above can be implemented in software, firmware, or hardware on a computing device. A computing device can include but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions in a non-transitory manner. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Figure 9:
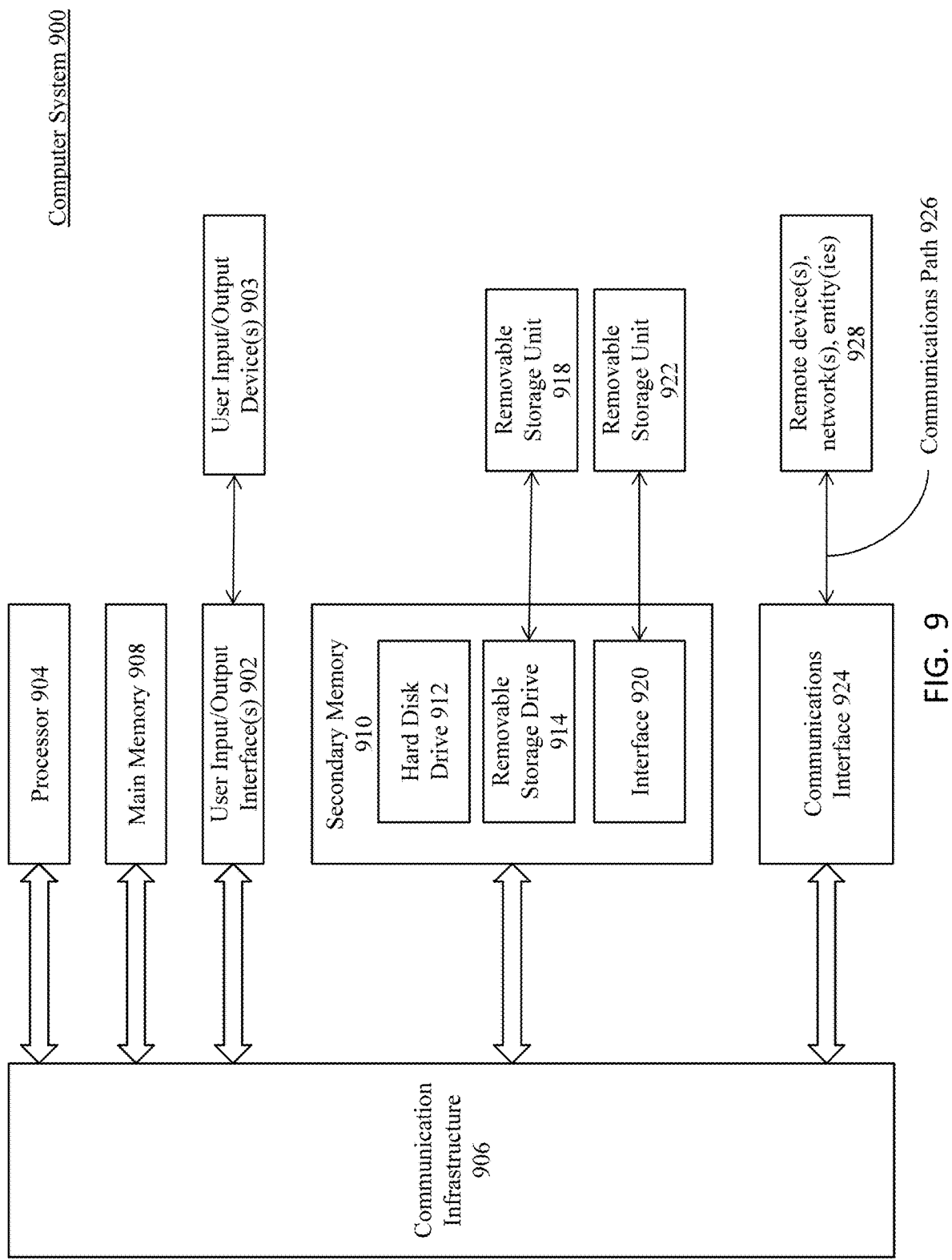
FIG. 9 is an example computer system, according to some embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system embodiments other than those described herein.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A method comprising:
   transmitting an intensity-modulated light through a mode conditioner to generate a mode-conditioned intensity-modulated light;
   transmitting the mode-conditioned intensity-modulated light through an optical fiber under test (FUT) to excite a plurality of modes of the optical FUT;
   converting the mode-conditioned intensity-modulated light transmitted through the optical FUT into an electrical signal;
   measuring, based on the electrical signal, a transfer function $S_{21}$ or a complex transfer function CTF(f) of the optical FUT based on at least on one pair of the plurality of modes;
   calculating a modal delay time of the optical FUT based on the transfer function $S_{21}$ or the complex transfer function CTF(f); and
   calculating a modal bandwidth of the optical FUT based on the modal delay time, the modal bandwidth being calculated for any given launch conditions of the plurality of modes.

2. The method of claim 1, wherein the plurality of modes consists of two modes, and wherein the at least one pair of modes consists of one pair of modes.

3. The method of claim 1, wherein the transfer function is based on a relative power ratio between the modes of the at least one pair of modes.

4. The method of claim 3, wherein the calculating the modal delay comprises fitting the transfer function $S_{21}$ using the following equation:

$$S_{21} = 20 * \log 10\{\sqrt{1+c^2+2c \cdot \cos[2\pi f(\tau_2-\tau_1)]}\} + d,$$

wherein c is the relative power ratio between the modes of the at least one pair of modes, and d is an optical loss of the optical FUT; or the following equation:

$$S_{21} = \frac{|\delta_1 * \exp(-2\pi\delta_1^2 f^2) + c * \delta_2 * \exp(-2\pi\delta_2^2 f^2)\exp[-i2\pi f(\tau_2-\tau_1)]|}{\delta_o * \exp(-2\pi\delta_o^2 f^2)} + d,$$

wherein c is the relative power ratio between the modes of the at least one pair of modes, d is an optical loss of the optical fiber, and $\delta_1$ and $\delta_2$ are the output pulse widths of the modes of the at least one pair of modes, respectively; or the following equation:

$$S_{21} = \sqrt{\sum_{j=1}^{n} a_j^2 + \sum_{j=1}^{n} \sum_{k \neq j, k=1}^{n} 2a_j a_k \cdot \cos[2\pi f(\tau_j - \tau_k)]},$$

wherein $a_j$ is the relative output powers in each mode compared to an input power, and $\tau_j$ is an absolute delay of the j-th mode.

5. The method of claim 1, wherein the optical FUT comprises an optical fiber operating at a wavelength between one of the wavelength ranges:
750 nm to 1650 nm;
850 nm to 1100 nm;
1260 nm to 1360 nm; or
1450 nm to 1600 nm.

6. The method of claim 1, wherein the modal delay is based on extracting a frequency at a minimum value of the transfer function $S_{21}$ or based on an oscillation period of the transfer function $S_{21}$.

7. The method of claim 1, wherein:
the measuring the transfer function $S_{21}$ or the complex transfer function CTF(f) comprises measuring the transfer function $S_{21}$ or the complex transfer function CTF(f) at multiple wavelengths over a wavelength range;
calculating the modal delay comprises fitting the modal delay as a function of wavelength through a polynomial fitting over the wavelength range until the modal delay reaches a minimum value.

8. A system comprising:
a mode conditioner coupled to an input end of an optical fiber under test (FUT), the mode conditioner being configured to:
condition an intensity-modulated light to generate a conditioned intensity-modulated light; and
transmit the conditioned intensity-modulated through the optical FUT;
a detector configured to convert the conditioned intensity-modulated light transmitted through the optical FUT into an electrical signal; and
a measuring system configured to:
receive the electrical signal from the detector;
based on the electrical signal, measure a transfer function $S_{21}$ or a complex transfer function CTF(f) of the optical FUT based on at least on one pair of the plurality of modes;
calculate a modal delay of the optical FUT based on the transfer function $S_{21}$ or the complex transfer function CTF(f); and
calculate a bandwidth of the optical FUT based on the modal delay, the bandwidth being calculated for any given launch conditions of the plurality of modes.

9. The system of claim 8, wherein the plurality of modes consists of two modes, and wherein the at least one pair of modes consists of one pair of modes.

10. The system of claim 8, wherein the transfer function is based on a relative power ratio between the modes of the pair of modes.

11. The system of claim 10, wherein the calculating the modal delay comprises fitting the transfer function $S_{21}$ using the following equation:

$$S_{21} = 20 * \log 10\{\sqrt{1+c^2+2c\cdot\cos[2\pi f(\tau_2-\tau_1)]}\}+d,$$

wherein c is the relative power ratio between the modes of the at least one pair of modes, and d is an optical loss of the optical fiber; or the following equation:

$$S_{21} = \frac{|\delta_1 * \exp(-2\pi\delta_1^2 f^2) + c * \delta_2 * \exp(-2\pi\delta_2^2 f^2)\exp[-i2\pi f(\tau_2-\tau_1)]|}{\delta_o * \exp(-2\pi\delta_o^2 f^2)} + d,$$

wherein c is the relative power ratio between the modes of the at least one pair of modes, d is an optical loss of the optical fiber, and $\delta_1$ and $\delta_2$ are the output pulse widths of the respective modes of pair of modes; or the following equation:

$$S_{21} = \sqrt{\sum_{j=1}^{n} a_j^2 + \sum_{j=1}^{n}\sum_{k\neq j, k=1}^{n} 2a_j a_k \cdot \cos[2\pi f(\tau_j - \tau_k)]},$$

wherein $a_j$ is the relative output powers in each mode compared to the input power, and $\tau_j$ is the absolute delay of the j-th mode.

12. The system of claim 8, wherein the optical FUT comprises an optical fiber operating at a wavelength between one of the wavelength ranges:
750 nm to 1650 nm;
850 nm to 1100 nm;
1260 nm to 1360 nm; or
1450 nm to 1600 nm.

13. A method comprising:
directing an input light signal having a first wavelength into an optical fiber under test (FUT), the optical FUT supporting a plurality of modes at the first wavelength, the plurality of modes comprising a first pair of modes, the input light propagating through the optical FUT to provide an output light signal;
determining a transfer function $S_{21}$ or a complex transfer function CTF(f) of the optical FUT at the first wavelength from a ratio of the output light signal to the input light signal; and
determining a modal delay time of the first pair of modes from the transfer function $S_{21}$ or the complex transfer function CTF(f).

14. The method of claim 13, wherein the input light signal comprises intensity-modulated light.

15. The method of claim 13, wherein the input light signal is characterized by a function $\hat{H}_{in}(f)$ in the frequency domain, the output light signal is characterized by a function $\hat{H}_{out}(f)$, f is frequency, and the transfer function $S_{21}$ is given by:

$$S_{21} = \left|\frac{\hat{H}_{out}(f)}{\hat{H}_{in}(f)}\right|.$$

16. The method of claim 15, wherein the function $\hat{H}_{out}(f)$ is given by:

$$\hat{H}_{out}(f) = a_1 \cdot \hat{H}_{in}(f)\cdot\exp(-i\cdot 2\pi f\tau_1) + a_2 \cdot \hat{H}_{in}(f)\cdot\exp(-i\cdot 2\pi f\tau_2)$$

where $a_1$ is an output power of a first mode of the first pair of modes, $a_2$ is an output power of a second mode of the first pair of modes, $\tau_1$ is a modal time delay of the first mode of the first pair of modes, and $\tau_2$ is a modal time delay of the second mode of the first pair of modes.

17. The method of claim 16, wherein the transfer function $S_{21}$ is given by:

$$S_{21} = \sqrt{a_1^2 + a_2^2 + 2a_1 \cdot a_2 \cdot \cos[2\pi f(\tau_2-\tau_1)]},$$

where $a_1$ is an output power of a first mode of the first pair of modes, $a_2$ is an output power of a second mode of the first pair of modes, $\tau_1$ is a modal time delay of the first mode of the first pair of modes, and $\tau_2$ is a modal time delay of the second mode of the first pair of modes; or by:

$$S_{21} = 20*\log 10\{\sqrt{1+c^2+2c\cdot\cos[2\pi f(\tau_2-\tau_1)]}\}+d$$

where c is the ratio between $a_2/a_1$ and d is a constant.

18. The method of claim 13, wherein the first wavelength is between 800 nm and 1100 nm.

19. The method of claim 13, wherein the plurality of modes comprises less than 6 modes.

20. The method of claim 13, wherein the plurality of modes comprises three or more modes, the three or more modes including the first pair of modes and a second pair of modes, the method further comprising determining a modal delay time of the second pair of modes from the transfer function $S_{21}$ or the complex transfer function CTF(f).

21. The method of claim 13, wherein the optical FUT supports a single mode at wavelengths greater than a second wavelength, the second wavelength exceeding the first wavelength.

22. The method of claim 21, wherein the second wavelength is 1260 nm or less.

23. The method of claim 13, wherein the transfer function $S_{21}$ comprises a plurality of maxima and a plurality of minima and the determining modal delay time comprises determining a reciprocal of a frequency difference between two adjacent maxima or two adjacent minima or determining a frequency of one of the plurality of minima.

24. The method of claim 13, further comprising determining a modal bandwidth from the modal delay time.

* * * * *

UNITED STATES PATENT AND TRADEMARK OFFICE
CERTIFICATE OF CORRECTION

Page 1 of 1

PATENT NO. : 11,012,154 B2
APPLICATION NO. : 16/905117
DATED : May 18, 2021
INVENTOR(S) : Xin Chen et al.

It is certified that error appears in the above-identified patent and that said Letters Patent is hereby corrected as shown below:

On the Title Page

In Column 2, Item (56), Other Publications, Line 2, delete "No. 141" and insert -- No. 14 --, therefor.

In the Claims

In Column 26, Lines 48-49, Claim 16, delete "$\tilde{H}_{out}(f)=a_1\cdot\tilde{H}_{in}(f)\cdot\exp(-i\cdot2\pi f\tau_1)+a_2\cdot\tilde{H}_{in}(f)\cdot\exp(-i\cdot2\pi f\tau_2)$" and insert -- $\tilde{H}_{out}(f)=a_1\cdot\tilde{H}_{in}(f)\cdot\exp(-i\cdot2\pi f\tau_1)+a_2\cdot\tilde{H}_{in}(f)\cdot\exp(-i\cdot2\pi f\tau_2)$, --, therefor.

In Column 26, Lines 66, Claim 17, delete "$S_{21}=20*\log 10\{\sqrt{1+c^2+2c\cdot\cos[2\pi f(\tau_2-\tau_1)]}\}+d$" and insert -- $S_{21}=20*\log 10\{\sqrt{1+c^2+2c\cdot\cos[2\pi f(\tau_2-\tau_1)]}\}+d$, --, therefor.

Signed and Sealed this
Seventh Day of September, 2021

Drew Hirshfeld
*Performing the Functions and Duties of the
Under Secretary of Commerce for Intellectual Property and
Director of the United States Patent and Trademark Office*